United States Patent [19]

Andersen

[11] Patent Number: 5,291,459
[45] Date of Patent: Mar. 1, 1994

[54] SIGNAL PROCESSOR HAVING MULTIPLE DISTRIBUTED DATA BUFFERS

[75] Inventor: Victor A. Andersen, North Dartmouth, Mass.

[73] Assignee: The United States of America as represented by the Secretary of the Navy, Washington, D.C.

[21] Appl. No.: 59,770

[22] Filed: May 7, 1993

[51] Int. Cl.$^5$ .............................................. H04B 11/00
[52] U.S. Cl. ................................................... 367/134
[58] Field of Search ............................... 367/134, 135; 364/221.4, 222.2; 375/6; 455/40; 370/94.1

[56] References Cited

U.S. PATENT DOCUMENTS

| | | | |
|---|---|---|---|
| 4,027,289 | 5/1977 | Toman | 364/443 |
| 4,041,442 | 8/1977 | Marquardt | 367/135 |
| 4,631,697 | 12/1986 | Ferguson | 364/920 |
| 4,638,445 | 1/1987 | Mattaboni | 364/424.01 |
| 4,718,004 | 1/1988 | Dalal | 364/178 |
| 4,809,217 | 2/1989 | Floro et al. | 364/919 |
| 4,980,870 | 12/1990 | Spivey et al. | 367/129 |
| 5,033,034 | 7/1991 | Paradise | 367/129 |
| 5,072,420 | 12/1991 | Conley et al. | 364/926.9 |

Primary Examiner—Daniel T. Pihulic
Attorney, Agent, or Firm—Michael J. McGowan; Prithvi C. Lall; Michael F. Oglo

[57] ABSTRACT

A hydrophone analog signal data acquisition, A/D conversion and data transmission system includes a first-stage signal processing subsystem which provides digital representations of the hydrophone analog signal, which in turn are signal processed for transmission in the form of data packets by a second stage signal processing subsystem (40). Subsystem 40 includes a plurality of Data Multiplexer/FIFO units (48), including corresponding selectively acting data unit accumulators, each accumulator having a plurality of inputs coupled to output channels of the first-stage signal processing subsystem for receiving digital representations of hydrophone analog signals. Each data unit accumulator includes a first buffer (48-2) for storing information that includes a digital representation of the analog hydrophone signal, an identification of a hydrophone that generated the acoustic information, and a time that the acoustic information is received from the hydrophone. Each data unit accumulator further includes an input interface that is operable during the first period for receiving a alert signal with a hydrophone analog signal, indicating that the associated source has data available. The input interface compares a current state of the alert signal to a previous state for detecting an occurrence of the assertion of the alert signal. The data unit accumulator also receives and stores a unit of data from a data source having an asserted alert signal, and is responsive to the storage of the unit of data therein, during the first period, to receive and store, during the second period, other information associated with the unit of data stored during the first period.

8 Claims, 19 Drawing Sheets

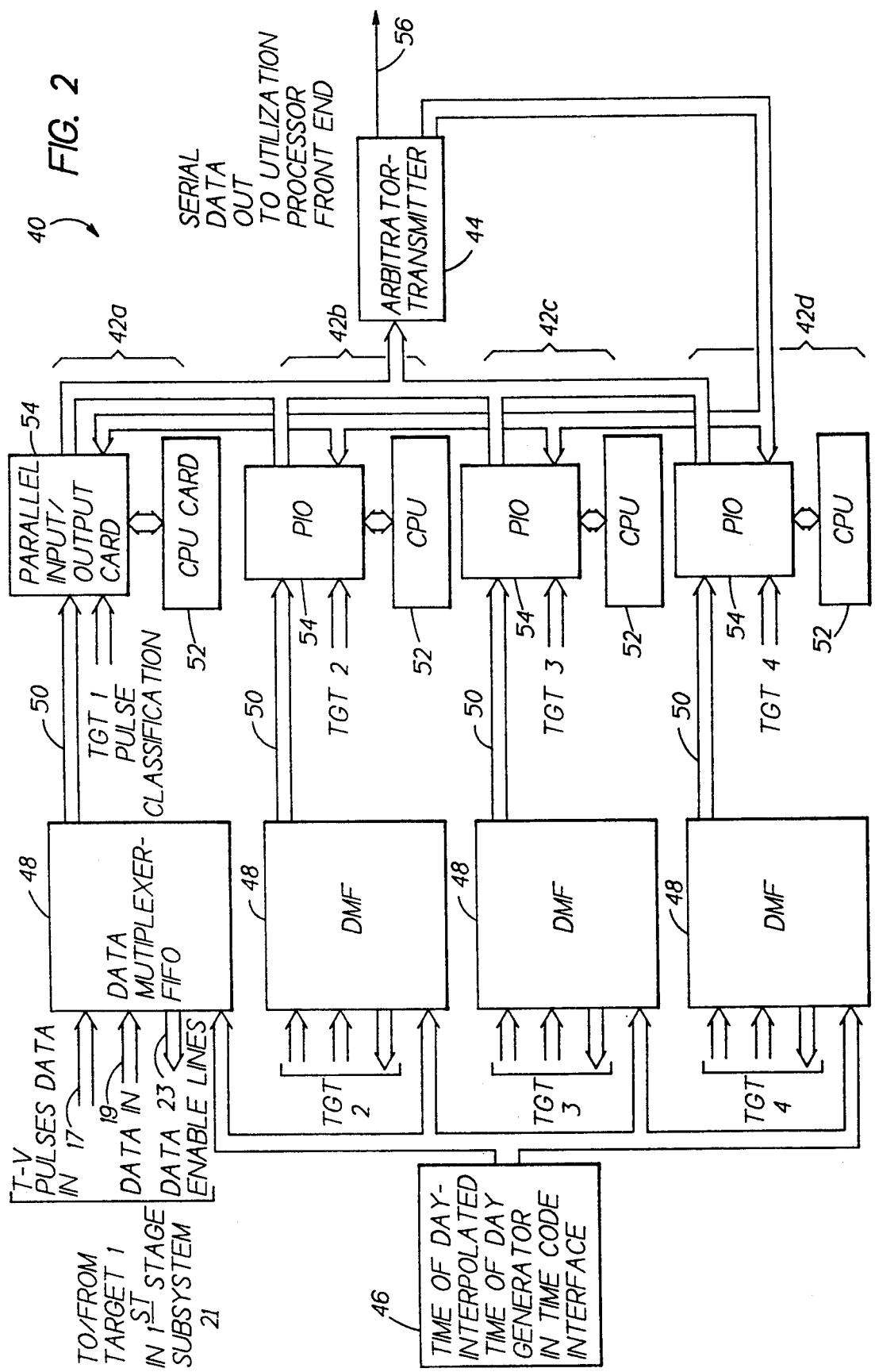

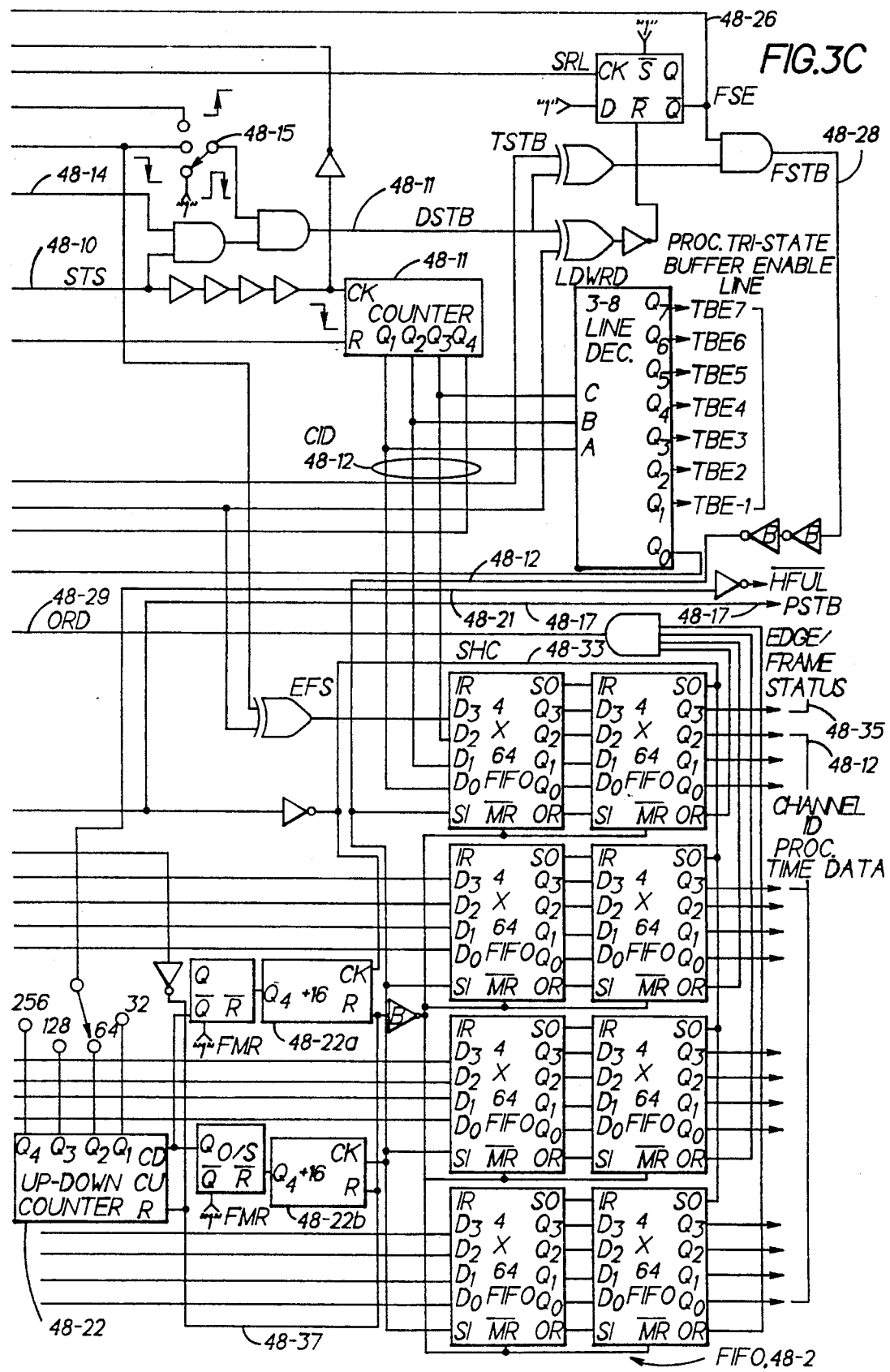

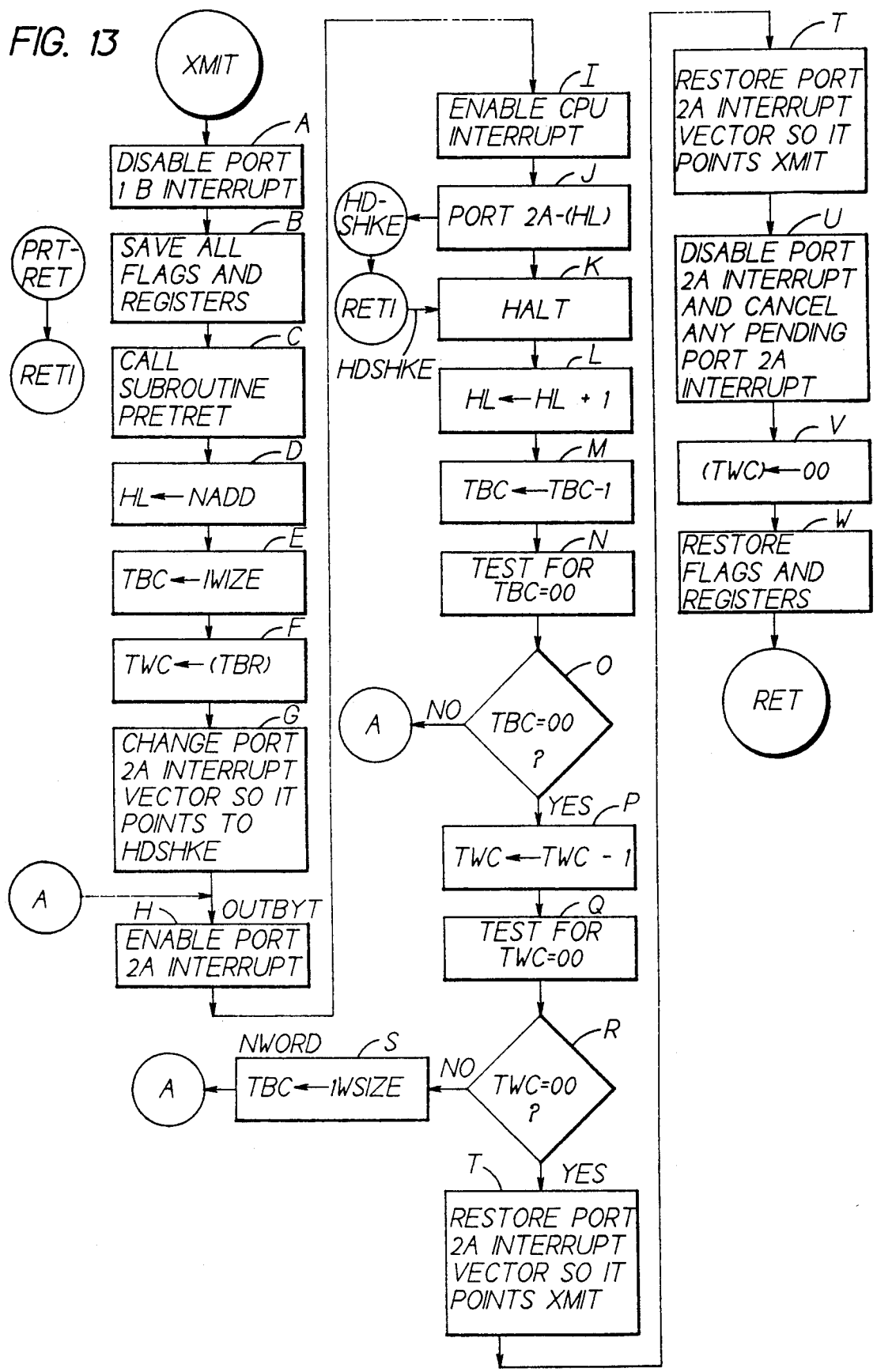

SIGNAL PROCESSOR HAVING MULTIPLE DISTRIBUTED DATA BUFFERS

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

The instant application is related to two co-pending U.S. patent applications entitled SIGNAL PROCESSOR SYSTEM HAVING MULTIPLE PARALLELED MICROPROCESSOR CONTROLLED SIGNAL PROCESSORS (Navy Case No. 73947); and SIGNAL PROCESSOR HAVING MULTIPLE PARALLELED DATA ACQUISITION CHANNELS AND AN ARBITRATION UNIT FOR EXTRACTING FORMATTED DATA THEREFROM FOR TRANSMISSION (Navy Case No. 73948).

BACKGROUND OF THE INVENTION

1. Field of the Invention

This invention relates generally to data acquisition circuitry and, in particular, to multichannel data acquisition circuitry for use with arrays of hydrophones.

2. Description of the Prior Art

FIG. 1 is a block diagram of a portion of a data acquisition system of a type referred to as a Second-Stage Signal Processing Subsystem, which constitutes prior art relative to which the present invention is an improvement. A First-Stage Signal Processing Subsystem (not shown, but referred to in FIG. 1 by a reference numeral 1) receives hydrophone signals that are routed to First-Stage Signal Processing Subsystem Processors. Each Analog Processor channel provides two output signals, a tracking-validation (T-V) signal 3 and a LOG AMP signal 5, which are inputs to the Second-Stage Signal Processing Subsystem. The T-V signal 3 is a digital pulse having a leading edge that occurs approximately coincidentally with a peak of a received hydrophone signal. The duration of the T-V pulse 3 is determined by the width of the received hydrophone signal. Stated another way, T-V pulse 3 is derived from changes of energy state of the analog signal. The LOG AMP signal 5 has an amplitude that varies as a function of the incoming signal level, or other state, of the incoming signal. During the time the T-V pulse 3 is on, the LOG AMP signal 5 is constant. The two output signals 3 and 5 from the First Signal Processor thus provide a basis for establishing the time of arrival of a target hydrophone pulse, the duration of the pulse, and the pulse amplitude. The same formats of T-V signal 3 and LOG AMP signal 5 exist with respect to the present invention.

The prior art Second-Stage Signal Processing Subsystem accepts the T-V Signal 3 and LOG AMP signal 5 and provides digital outputs which are sent to a range computer (not shown). Two types of data are transmitted: lead words and data words.

Timing information is obtained from a range time code generator. During normal operation, a lead word is generated every eight seconds and timing information (hours, minutes and seconds) 7 is stored in a lead word register 35. The lead word also contains site identification information 9, a bit which identifies the word as a lead word, and a special event code 11. The special event code 11 is entered by an operator using switches provided with the Second-Stage Signal Processing Subsystem.

Data words are generated whenever valid hydrophone signals are received (i.e, time coordinated with the asynchronous hydrophone outputs). The prior art Second-Stage Signal Processing Subsystem can be programmed to verify long, short or zero pulses, and also to reject pulses which are excessively long. Timing information for the data word 13 is obtained from a binary counter. The binary counter is reset at the same instant that the lead word is formed, and counts with a resolution of 10 microseconds until the next reset occurs (which will always be eight seconds later). When the T-V pulse 3 is received, timing information 13 is stored in the data word. The width of the T-V pulse 3 is determined and, if it is found to be a valid signal, it is classified as a frame, or ordinary pulse. The pulse width and pulse amplitude 15 data are stored in the data word, along with an identification 17 as to site, target and receiving hydrophone. In addition, a computer tag code is entered in the data word. Also, both the lead words and data words contain dummy bits having a fixed, predetermined pattern for identifying the beginning of the word.

After the data has been established, the lead words and data words are stored in a buffer 19. Buffer 19 provides temporary storage for these words until a communication link 21 is able to transfer them to the range computer (not shown) for further processing.

The prior art Second-Stage Signal Processing Subsystem includes seven data channels 23 for each target it is capable of tracking, only two of which are shown. Each data channel 23 in the prior art Second-Stage Signal Processing Subsystem is coupled to an analog processor channel in the First-Stage Signal Processing Subsystem 1 so as to receive the T-V signals 3 and the LOG AMP signals 5 that are generated as outputs of the mating analog processor channel.

Each Data Channel 23 is comprised of three basic components: (1) a Digital Signal Verifier 25, (2) a Voltage-to-Frequency Converter 27, and (3) the Data word Register 29. The Digital Signal Verifier 25 verifies each T-V signal 3 received on the basis of pulse width. Only signals conforming to the width requirements for a valid signal are verified. Front panel control switches enable some variation of the pulse width requirements. The Voltage-to-Frequency Converter 27 converts the LOG AMP signal 5 into a proportionate frequency representation. The Data Word Register 29 counts this frequency over an established time base to produce a binary representation of the pulse amplitude. The Data Word Register 29, provided in each data channel 23, temporarily stores the time of arrival of the leading edge of each T-V signal 3 that is verified by the Digital Signal Verifier 25. The Data Word Register 29 also determines and stores the amplitude and width of the T-V signal 3, and categorizes the signal, on the basis of pulse width, as either a Frame or Ordinary T-V signal. Complete identification of the T-V signal 3 is also a function of the Data Word Register 29. This identification consists of the target which generated the original signal, and the identification of the hydrophone and site which received the signal. The data temporarily stored in a particular Data Word Register 29 enables the generation of a Data Readout Request signal which identifies the associated Data Word Register 29 as one containing information to be conveyed to the range computer.

An electronic sensor 31 sequentially interrogates each data channel 23 to determine if its Data Readout Request signal is active. When the electronic scanner 31 locates such a data channel 23, it stops scanning until the stored data is transferred to the buffer 19. In the process of transferring the data to the buffer 19, a beginning-of-word code is added to the word format. The beginning-of-word code enables the range computer to define the beginning and end of a word, as it is being received.

After the data word is stored in the buffer 19, a Data Readout Acknowledge signal 33 is generated which frees the Digital Signal Verifier 25 and Data Word Register 29 to accept subsequent T-V signals 3, and to restart the scanner 31 on the sequential interrogation of data channels 23.

The timing information 13 stored in each Data Word Register 29 is an interpolation of a time from a last synchronizing signal 37 to the time that the leading edge of the T-V signal 3 is received. Therefore, so as to provide complete information on the timing of the T-V signal 3, the time at which the synchronizing signal 37 was received is also recorded. This is accomplished by the Lead Word Register 35, which operates similarly to a Data Word Register 29, differing only in the type of information it stores.

The buffer 19 provides a buffering function between the irregular rate of data output from the data channels 23 and the established data rate of the communication channel 21 that links the equipment at each site to the range computer. The output of the Second-Stage Signal Processing Subsystem is a signal wire which conveys the data in bit serial form to the communication link 21.

The prior art Second-Stage Signal Processing Subsystem also contains hydrophone switching control equipment (not shown) for switching the inputs to the analog processor channels to appropriate hydrophones, on the basis of received switching command codes. These switching command codes may be generated remotely by a utilization processor which finally utilizes the data. Typically such a utilization processor is a range computer, which is operable for commanding the switching at all sites. Alternatively the command codes may be generated locally by the operator at each site. Each switching command code is addressed to the seven analog processor channels of the Second-Stage Signal Processing Subsystem that are provided to track one particular target. The switching code keeps these channels connected to an array of seven hydrophones whose location within a hydrophone field provides optimum coverage of a particular target. The switching equipment also provides the encoding required to provide identification of the hydrophone from which a verified signal is received. This identification becomes part of the data word, as previously described.

One disadvantage of this prior art Second-Stage Signal Processing Subsystem is that only one output buffer (buffer 19) is available. Thus, if buffer 19 malfunctions, all data can be lost and the entire system disabled. A further disadvantage is that the Signal Verifier and Data Word Register are capable of accepting only one signal at a time from the array of hydrophones. As a result, if the Signal Verifier and Data Word Register are in use, other information being transmitted for that channel can be lost.

Some data acquisition systems of the prior art are illustrated in the following U.S. Patents.

U.S. Pat. No. 4,718,004 to Dalal discloses a sample data acquisition system. The data acquisition system includes a plurality of signal conditioners 14$a$, 14$b$, 14$c$ and 14$d$, each for sampling a number of analog input signals. Each signal conditioner includes: an analog multiplexer (MUX) for sequentially sampling each of a plurality of analog input signals, an A/D converter for receiving an amplified version of a sampled analog signal and converting it to a 16 bit digital data word, and a microcomputer and memory for controlling data transfer and storing digital data words.

U.S. Pat. No. 4,980,870 to Spivey et al. discloses an array beamformer system including a plurality of acoustic detectors. Analog signals output from each detector are processed by separate converters, each converter comprising a low pass filter, an A/D converter, and a microprocessor. A multiplexer accumulates all signals for given times, and a high speed array processor performs recursive calculations to determine a signal vector.

U.S. Pat. No. 4,041,442 to Marquardt discloses an acoustic data acquisition system for acquiring acoustic information from an array and for transmitting the information through a single transmission line to remotely located data processing equipment. The array includes a plurality of sensors, a plurality of submultiplexers, a multiplexer and an A/D converter.

U.S. Pat. No. 5,033,034 to Paradise discloses an acoustic tracking system including a selected number of acoustic sensor elements, each having a separate signal conditioner coupled thereto. A processor receives conditioned signals from respective signal conditioners and enables comparisons of selected characteristics of received signals in order to determine a selected parameter related to the movement of a body.

U.S. Pat. No. 4,631,697 to Ferguson discloses a multichannel electronic waveform recorder for storing waveform data and time of occurrence information (i.e., a time-tag) for each stored value of an input waveform.

U.S. Pat. No. 4,638,445 to Mattaboni discloses a vision system for mobile robots that reads out arrays of sensors. A Decision Engine formulates a decision, a course of action, and determines a mode of operation for the robot.

U.S. Pat. No. 4,027,289 to Toman discloses a data measurement subsystem and provides for a plurality of navigational signal transmitters. Different subsystems include microprocessors and a data store. Interconnections are provided to a remote control.

U.S. Pat. No. 5,072,420 issued to Conley discloses an arbiter state machine. When data transfer for or from a FIFO nears an overrun or underrun condition, the data channel issues an urgent request to the arbiter state machine.

U.S. Pat. No. 4,809,217 issued to Floro discloses a periodic execution of an I/O scan sequence in which remote modules are addressed in sequence.

SUMMARY OF THE INVENTION

An object of this invention is to provide a Second-Stage Signal Processing Subsystem having improved buffering characteristics that significantly enhance the fault tolerance of the system.

A further object of this invention is to provide a Second-Stage Signal Processing Subsystem wherein each target port has an associated buffer, thereby enabling the reception of more than one unit of information from a particular channel and thereby preventing the loss of information.

The foregoing and other problems are overcome and the objects of the invention are realized by a selectively acting data unit accumulator which receives data from a plurality of data sources. The data unit accumulator includes a timer circuit for establishing an operating cycle having a first period followed by a second period. The data unit accumulator further includes an input interface that is operable during the first period for receiving an alert signal from individual ones of the data sources. An assertion of an alert signal indicates that an associated data source has data available for outputting to the data unit accumulator. The input interface further includes a comparator for each of the alert signals, the comparator comparing a current state of the alert signal to a previous state for detecting an occurrence of the assertion of the alert signal. The data unit accumulator further includes a data buffer that is responsive to the operation of the comparator for receiving and storing, during the first period, a unit of data from a data source having an asserted alert signal. The data buffer is also responsive to the storage of the unit of data therein, during the first period, for receiving and storing, during the second period, other information that is associated with the unit of data stored during the first period.

More particularly, this invention provides a multichannel signal processing system that includes a plurality of signal processing units each of which has inputs coupled to a plurality of hydrophones for receiving acoustic information therefrom. Each of the signal processing units includes a first buffer, preferably a First In/First Out (FIFO) buffer, for storing information that includes a digital representation of the acoustic information, an identification of a hydrophone that generated the acoustic information, and a time that the acoustic information, and a time that the acoustic information is received from the hydrophone.

The signal processing system further includes a plurality of data processing units, individual ones of which have an input coupled to an output of the first buffer of one of the signal processing units. Each of the data processing units operates to read out and to format the stored information, for each of the hydrophones coupled via analog signal processors to the associated signal processing unit, into a data packet having a predetermined format and providing temporary storage for such data packets.

The signal processing system further includes an arbitration and transmission unit having an input coupled to an output of each of the data processing units. The transmission unit includes circuitry for sequentially polling each of the data processing units to receive a data packet therefrom. The transmission unit also includes a second buffer, also preferably a FIFO buffer, for buffering a data packet received from one of the data processing units, and further includes circuitry, coupled to an output of the second buffer into a bit serial format for transmission to a further unit, such as range computer.

Each of the signal processing units includes circuitry that is responsive to the first buffer attaining a predetermined partially full condition for generating a status signal. The polling circuitry of the transmission unit is responsive to the generation of one of the status signals for interrupting the sequential polling of the plurality of data processing units and for establishing communication with a data processing unit associated with the signal processing unit that generated the status signal.

The system also includes a plurality of data signal and power interconnect units individual ones of which are coupled between one of the data processing units. The interconnect units are provided such that a physical removal of one of the interconnect units from the signal processing system does not impact the operation of the other ones of the plurality of signal processing units and associated data processing units.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein:

FIG. 2 is a block diagram of the improved Second-Stage Signal Processing Subsystem of this invention;

FIGS. 3A-3C are schematic diagrams of the Data Multiplexer/FIFO (DMF) of FIG. 2, with FIG. 3A depicting the spatial relationship of FIG. 3B to FIG. 3C;

FIGS. 7-13 are each a logic flow diagram illustrating the operation of a subroutine of the main software routine of FIG. 6.

DESCRIPTION OF THE PREFERRED EMBODIMENT

Figure 1:
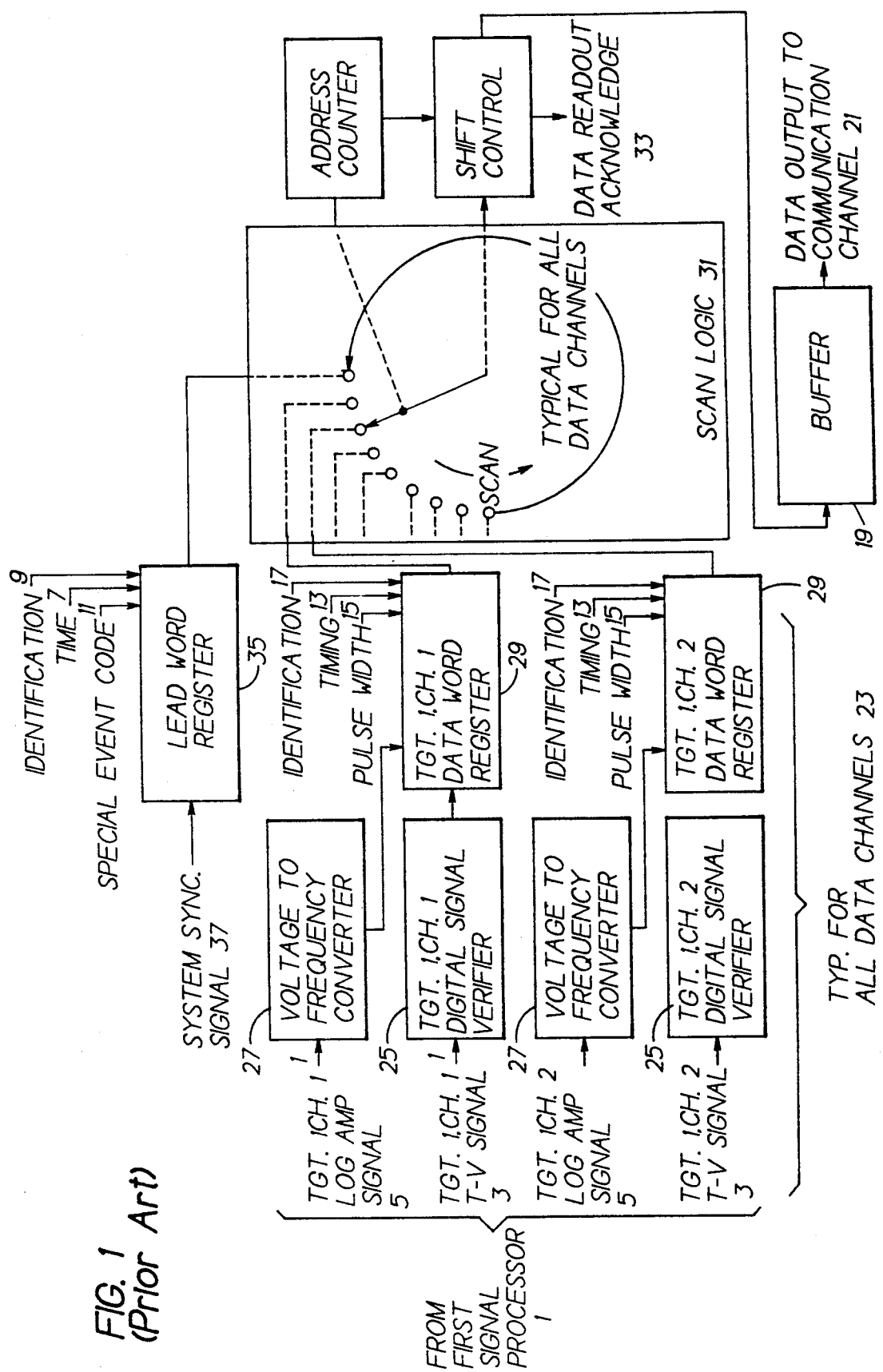
FIG. 1 is a simplified block diagram of a portion of a Second-Stage Signal Processing Subsystem of the prior art.

FIG. 2 is a block diagram of the novel Second-Stage Signal Processing Subsystem 40 of this invention. Second-Stage Signal Processing Subsystem 40 is comprised of four target ports 42a-42d, an Arbitrator Transmitter (ATX) 44, and a Time Code Interface 46, which is incorporated within a time-of-day-interpolated, (ITOD) time-of-day (TOD) generator including a real-time clock. Time code interface 46 may be of the type disclosed in commonly assigned, copending application Ser. No. 07/813,563, filed Dec. 26, 1991, hereby incorporated by reference in full. Although four target tracking capability is shown in FIG. 2, the system readily supports up to eight target ports (eight target tracking capability). Each target port 42 includes four printed circuit boards: (1) a Data Multiplexer/FIFO board 48, (2) a Feed-Thru board 50, (3) a Central Processor Unit (CPU) board 52, and (4) a Parallel Input/Output board 54. As will become apparent as the description proceeds, FIFO board 48 is inclusive of a selectively acting data unit accumulator, or more generally a signal processing unit. The Central Processor Unit board 52 and the Parallel Input/Output board 54 include the hardware and firmware support necessary to accept data from the Data Multiplexer/FIFO board 48 and to transmit processed data packets to the Arbitrator Transmitter board 44. The Arbitrator Transmitter board 44 accepts data packets from the four target ports 42a-42d and transmits the data serially to the front end of ports 42a–42d a utilization processor 56, where utilization of the transmitted data at the output of the data acquisition circuitry is made. An example of utilization processor 56 is an undersea acoustic range, on-line, recording and graphic display system operated by the U.S. Navy.

As a general overview, the Second-Stage Signal Processing Subsystem 40 accepts processed acoustic (hydrophone) data from the First-Stage Signal Processing Subsystem (not shown) in the form of the T-V pulse signals and digital LOG AMP data described hereinbefore in the Background of Invention section hereof. The Second-Stage Signal Processing Subsystem 40 then provides digital outputs to the utilization processor means front-end 56. Two types of data are transmitted: lead words and data words. Timing information is provided by a time code generator and supplied to the Second-Stage Signal Processing Subsystem 40 by a Time Code Interface (TCI) (which, as stated earlier, is a part of the interpolated-time-of-day generator 46). Each target channel of the Second-Stage Signal Processing Subsystem 40 is capable of processing data from seven hydrophone channels of the First-Stage Signal Processing Subsystem. The following paragraphs provide a detailed description of the components of Second-Stage Signal Processing Subsystem 40 and their functions.

DATA MULTIPLEXER/FIFO 48

The Data Multiplexer/FIFO 48, the DMF, (which as hereabove noted is inclusive of a selectively acting data unit accumulator) receives T-V alert pulses 17 and processed hydrophone data 19 from one or more of the seven First-Stage Signal Processing Subsystems connected to it. The DMF 48 also transmits data enable signals 23 to the seven First-Stage Signal Processing Subsystems, as well as processed data to the next stage of the Second-Stage Signal Processing Subsystem 40, namely the Central Processor Unit (CPU) 52, via the Parallel Input/Output (PIO) 54. Time-of-day and interpolated time-of-day 25 are also received by the DMF 48 and transmitted to the CPU 52 via PIO 54. Each target port 42a–42d operates upon seven individual channels of hydrophone data, as processed by seven First-Stage Signal Processing Subsystems.

The DMF 48 tests the seven First-Stage Signal Processing Subsystems 21 every ten microseconds for processed data, and stores this data, in a First In/First Out (FIFO) Buffer 48-2 (FIG. 3), along with the associated interpolated time-of-day (ITOD) from the TCI in 46.

Upon request from the next stage of the Second-Stage Signal Processing Subsystem 40, and from the CPU 52 and from the PIO 54, the DMF 48 transmits buffered data for further processing, formatting, and eventual serial transmission to the utilization processor front end 56.

Figure 3A:
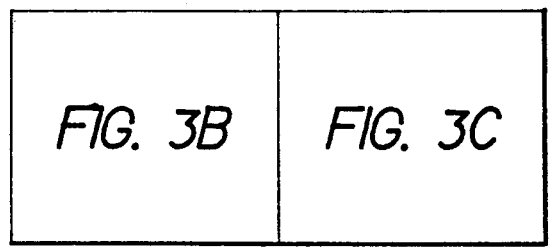
Figure 3B:
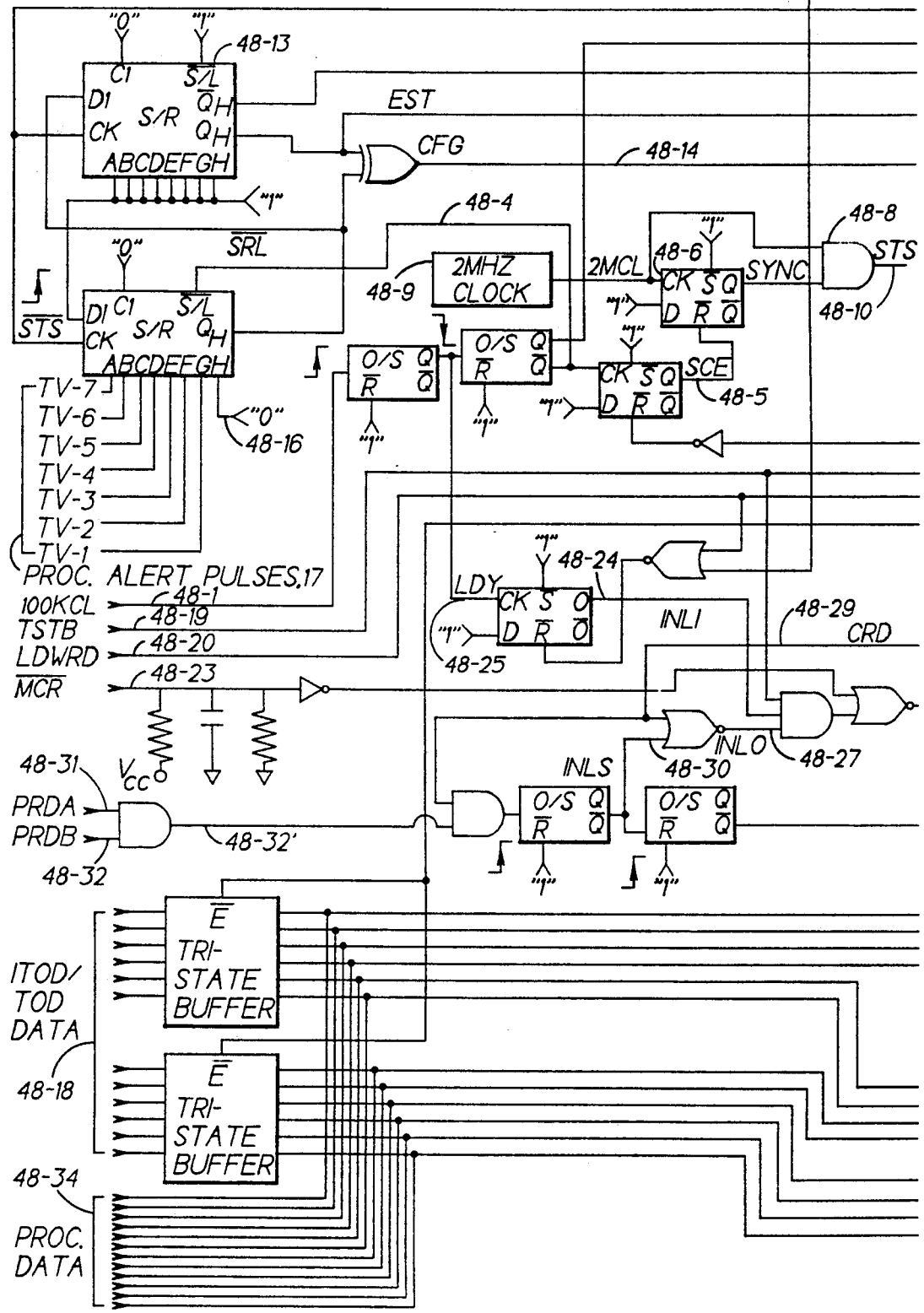

FIGS. 3A–3C are schematic diagrams that shows in greater detail the DMF 48. A basic clock of the DMF is a 100 KHz clock 48-1, provided from the TCI 46, that generates a five microsecond window (ten microsecond cycle). During the five microsecond window the alert pulse lines (TV-1 to TV-7) from the First-Stage Signal Processing Subsystems are tested for activity and, if activity is detected, hydrophone data is stored in the FIFO 48-2. The rising edge of the window pulse causes a first shift register 48-3 to parallel load the present states of the seven TV lines. The rising edge of an active low Serial Load (SRL) pulse 48-4 raises a SYNC Enable (SCE) 48-5 which, in turn, lifts the reset from a SYNC flip-flop 48-6. A SYNC signal line 48-7 then goes high, which enables a gate 48-8 to output a 2 MHz clock 48-9 to produce quarter-microsecond pulses (half microsecond cycle). Each pulse, designated 48-10, performs two functions. A first function is to update a counter 48-11, and to thus change a channel identification (CID) 48-12. The CID 48-12 corresponds to the identification of the First-Stage Signal Processing Subsystem being tested. This, in turn, activates or enables one of the associated data enable lines (TBE1–TBE7) for the First-Stage Signal Processing Subsystem being tested. The second function of a pulse 48-10 is to clock shift registers 48-3 and 48-13 with inverted STS pulses. During each STS pulse, the recently loaded TV signals are serially shifted from shift register 48-3 to the shift register 48-13, while at the same time the outputs of shift registers 48-3 and 48-13 are compared. Thus, current alert state data, as expressed by the T-V signals, is compared to previous alert state data (stored in 48-13) for each First-Stage Signal Processing Subsystem, while at the same time the current alert state data replaces the previous alert state data to become the next cycle's previous data. Any changes between current and previous alert state data causes a Change Flag (CFG) 48-14 to go high. This indicates that a change in state has occurred in the alert pulse whose state is being tested. In that this signal is coincident with an STS pulse 48-10, a Data Strobe (DSTB) 48-15 is generated. If there is no difference between the prior and present alert state data, no DSTB 48-15 is generated for the First-Stage Signal Processing Subsystem channel currently being tested.

It is important to note that, although only seven alert lines are tested, the shift registers 48-3 and 48-13 are eight bit devices. To accommodate this difference, a logic zero 48-16 is loaded into the MSB of the first shift register 48-3 with each power up. Thus, the first STS pulse 48-10 of any cycle will never be transmitted to the FIFO 48-2, since its corresponding comparison will never detect a state change.

During the first STS pulse 48-10 the counter 48-11 is at count zero. The falling edge of this pulse 48-10 increments the CID 48-12 to a one, and begins valid comparisons of the pulse data. The rising edge of the second STS pulse 48-10 generates the DSTB 48-15 of the first channel, which then strobes the FIFO 48-2, by way of FIFO Strobe (FSTB) 48-28, to input the first channel's data (only if a state change has been detected). The falling edge of the second pulse 48-10 increments CID 48-12 to a two, enables the second channel's input data lines, and compares the second channel's alert states (TV2). The third STS pulse 48-10 then generates the second channel's DSTB 48-15, and the process continues until the eighth STS pulse 48-10 generates the seventh channel DSTB 48-15. The falling edge of the eighth STS pulse 48-10 cause the counter 48-11 to drop the SYNC signal 48-7 low, which consequently disables any further STS pulses 48-10 for this cycle. The counter 48-11 is also reset, and thus becomes ready to count the next ten microsecond cycle's STS pulses 48-10. The seven alert pulse states have also been shifted to the second shift register 48-13 to await comparison with new alert pulse states.

Jumper 48-36 allows the DMF 48 to be configured to strobe Data 48-34 into FIFO 48-2 on rising edge state changes, falling edge state changes, or both rising and falling edge state changes. For the purposes of this description, DMF 48 is configured to strobe data 48-34 into FIFO 48-2 on both the rising and falling edge state changes.

During the second half of the ten microsecond cycle, interpolated time-of-day (ITOD) 48-18 becomes available from the Time of Day Generator 46 on the data input lines. Two Time Strobes (TSTB) 48-19 are generated (two data words for interpolated time), and if any First-Stage Signal Processing Subsystem data was stored in the FIFO 48-2 for this cycle, the FIFO 48-2 is also strobed to input the interpolated time-of-day 48-18, thereby time-tagging the buffered data.

If no First-Stage Signal Processing Subsystem data was stored during the previous 5 microsecond window, then the strobe to input the interpolated time-of-day 48-18 is not transmitted to the FIFO 48-2. Another instance involving time data is when a Lead Word window (LDWRD) 48-20 is generated. The LDWRD 48-20 is generated every eight seconds, and causes the FIFO 48-2 to input four words of time-of-day (TOD) 48-18, whether or not there is First-Stage Signal Processing Subsystem data present.

A Half Full Signal (HFUL) 48-21 is generated whenever the FIFOs 48-2 of the DMF 48 reach a half full status. This signal is transmitted to the Arbitrator Transmitter 44 as a warning that a possibility of losing data exists if data is not soon extracted from the FIFO 48-2. The HFUL 48-21 is generated by an up-down counter 48-22 in conjunction with auxiliary counters 48-22a and 48-22b. Counter 48-22 is clocked in the appropriate direction whenever data is received or extracted from the FIFOs 48-2. The processing of the HFUL signal 48-21 by the Arbitrator Transmitter 44 is described in detail below.

A FIFO clear signal 48-37 causes a reset of the FIFOs 48-2, as well as a reset of the three counters 48-22, 48-22a, 48-22b, and can take place under either of two conditions. The first condition occurs when the master clear (MCR) signal 48-23 is generated. The second condition occurs when three separate events occur during the same ten microsecond clock cycle. Firstly, the FIFO 48-2 must have transmitted its last data word to the next stage (i.e., the FIFO 48-2 is empty). Secondly, there must not be any data that is just about to be strobed into the FIFO 48-2. Lastly, a Time Strobe (TSTB) 48-19 must be generated. That is, the TSTB 48-19 is used as a master reset strobe when there is no data entering, stored, or leaving the FIFO 48-2. If any of these conditions are true, then the FIFO reset is inhibited. The purpose of this reset signal is to minimize errors in the FIFO 48-2 data by ensuring a periodic reset of the FIFO.

In greater detail, each rising edge of the ten microsecond clock causes an Input Interlock (INLI) 48-24 to be raised, at least momentarily, via clock LDY 48-25. Should there be hydrophone data being inputted, FSE 48-26 will become true during half of the ten microsecond clock and will reset INLI 48-24. If no hydrophone data is being processed, but a Lead Word is detected, LDWRD 48-20 will be true before any TSTB 48-19 pulses arrive, thereby setting FSE 48-26 and resetting INLI 48-24. An output Interlock (INLO) 48-27 prevents the FIFO reset 48-37 if there is data stored in the FIFO 48-2, regardless of the state of INLI 48-24. Whenever a PSTB 48-17 is issued, INLO 48-27 is asserted (active low) just prior to PSTB 48-17 and is maintained asserted slightly beyond the end of PSTB 48-17. The transmission of PSTB 48-17 causes a FIFO ORD 48-29 signal to go low. If there is more data in FIFO 48-2, ORD 48-29 will quickly return high and continue to assert INLO. An INLS pulse 48-30 enforces INLO 48-27 during this time interval to prevent inadvertent FIF clear pulses. Should ORD 48-29 not return high in the time allotted by INLS 48-30, INLO 48-27 is de-asserted (goes high). If INLI 48-24 has not been reset by data input activity, and if TSTB pulses 48-19 are present, the FIFO 48-2 is cleared by FIFO clear signal 48-37.

When the next suborganization of the target port, namely the Parallel Input/Output 54 and Central Processor Unit 52 circuitry, is ready to accept data, two ready states are generated (PRDA 48-10 31 and PRDB 48-32) for each of two data ports. These signals are gated together to result in one data ready state (48-32'). If there is data stored in the FIFO 48-2, a Shift Out pulse (SHO) 48-33 is generated and causes the FIFO 48-2 to output stored data to the next stage. The PSTB 48-17 pulse is generated to force the next stage to accept the data that is available. If no data is available in the FIFO 48-2, the SHO signal 48-33 is not generated. The Output Ready (ORD) 48-29 line is used to indicate whether there is data available in the FIFO 48-2.

Each sixteen bit data word consists of twelve bits of either First-Stage Signal Processing Subsystem data 48-34 or interpolated time-of-day/time-of-day data 48-18. The remaining four bits are reserved for three CID 48-12 bits and one edge/frame status bit 48-35. The latter is employed to eventually enable the determination of pulse width, when the other twelve bits represent First-Stage Signal Processing Subsystem data 48-34. When the other twelve bits are time-of-day data, the CID bits are set to zeros. The edge/frame status bit 48-35 is set to a one if the other 12 bits are time-of-day and interpolated time-of-day data; otherwise it is a zero, signifying that the other 12 bits are interpolated time-of-day data only.

FEED-THRU BOARD 50

Each target port of the Second-Stage Signal Processing Subsystem 40 includes a Feed-Thru board 50. The purpose of this board is to facilitate a quick disconnect and power down of its associated target port from the remaining target ports, without interfering with the operation of the remaining target ports. In this way, range tracking can continue at a reduced capability in the event of a target port failure.

Referring to FIG. 2, the Feed-Thru board 50 is a printed circuit board that receives signals from the P10 card 54, the Arbitrator Transmitter 44 and the Time Code Interface 46 (part of the interpolated-time-of-day-generator), and passes these signals to the appropriate destinations in the target port.

Figure 4:
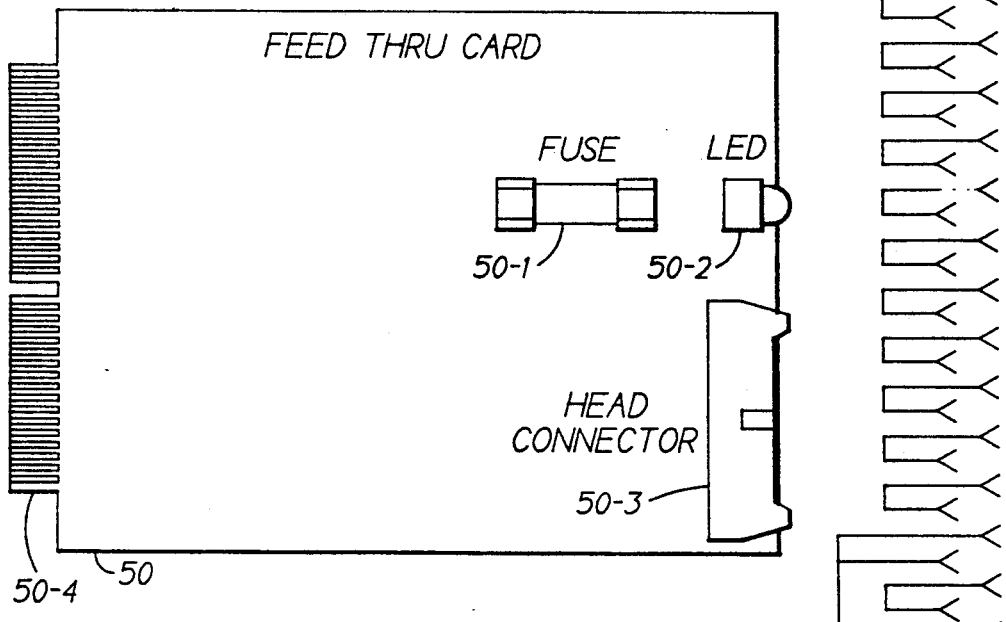
FIG. 4 is a depiction of a feed thru card.

Referring to FIG. 4, there are three components on the Feed-Thru board: (1) a fuse 50-1 to provide electrical protection for the target port, (2) an LED 50-2 to provide a visual status of the fuse 50-1, and (3) a 26-pin connector 50-3 to allow ribbon cable connection with the Parallel Input/Output board. An edge connector 50-4 is also provided.

Figure 5:
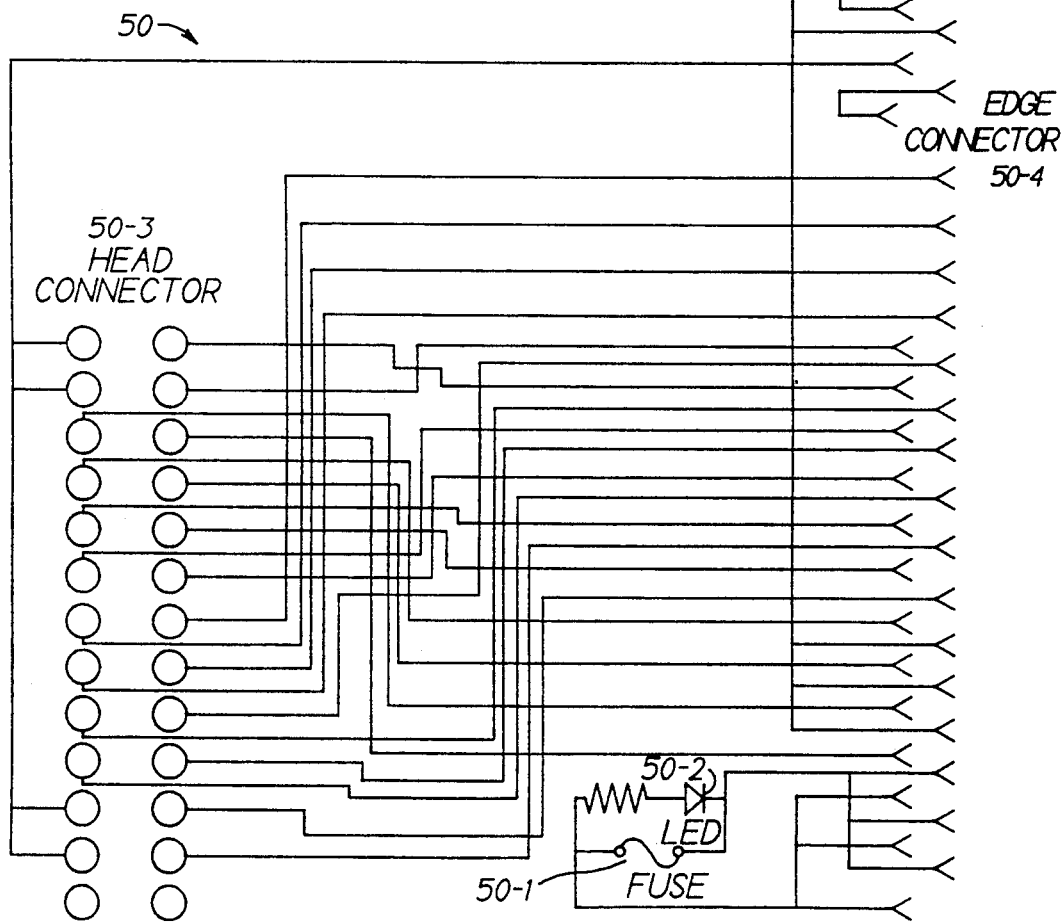
FIG. 5 is a schematic diagram of the feed thru card, of FIG. 2.

Referring to FIG. 5, card edge pins 1-18 are physically wired to pins 36-53, respectively. Signals from the Time Code Interface 46 (part of interpolated-time-of-day generator) are received on pins 1-18 and are passed to the DMF 48 via pins 36-53. Pins 20-29 receive signal lines that are connected to the switches of the front panel control. They are routed to the 26-pin connector 50-3 from which there they are passed to the Central Processor Unit 52. Pins 58 and 59 receive signal lines from the Arbitrator Transmitter 44. They too are routed to the 26-pin connector 50-3 and are then passed to the Central Processor Unit 52. Eight data signals from PIO 54 are routed via connector 50-3 to pins 60-67 of connector 50-4. Ultimately, these data signals go to Arbitrator Transmitter 44. Voltage Vcc for the target port enters on pins 68,69, and 70.

When the Feed-Thru board 50 is physically removed, connections for power and all mentioned signal paths are broken. Hence, the target port is completely disabled from the Second-Stage Signal Processing Subsystem 40 without affecting the operation of the remaining target ports.

CENTRAL PROCESSOR UNIT 52 AND PARALLEL INPUT/OUTPUT 54

Referring again to FIG. 2, the Central Processor Unit (CPU) 52 of the Second Signal Processor 40 is responsible for the control of data transfers between the DMF 48 and the Parallel Input/Output (PIO) 54; and between the PIO 54 and the Arbitrator Transmitter board 44. A Z80 single board computer with onboard ROM and RAM, interfaced to the PIO 54 via a standard bus, performs this task under software control. The construction of the Z80 single board computer and the associated PIO is conventional, and is not described in further detail. Each target port has an associated CPU 52, and all target ports operate in an identical manner. The operating software includes a main program (MRTTTP) (FIG. 6) which in turn is comprised of several subroutine program modules (FIGS. 7-13). The discussion of the main program and the various subroutine program modules follows.

Figure 6:
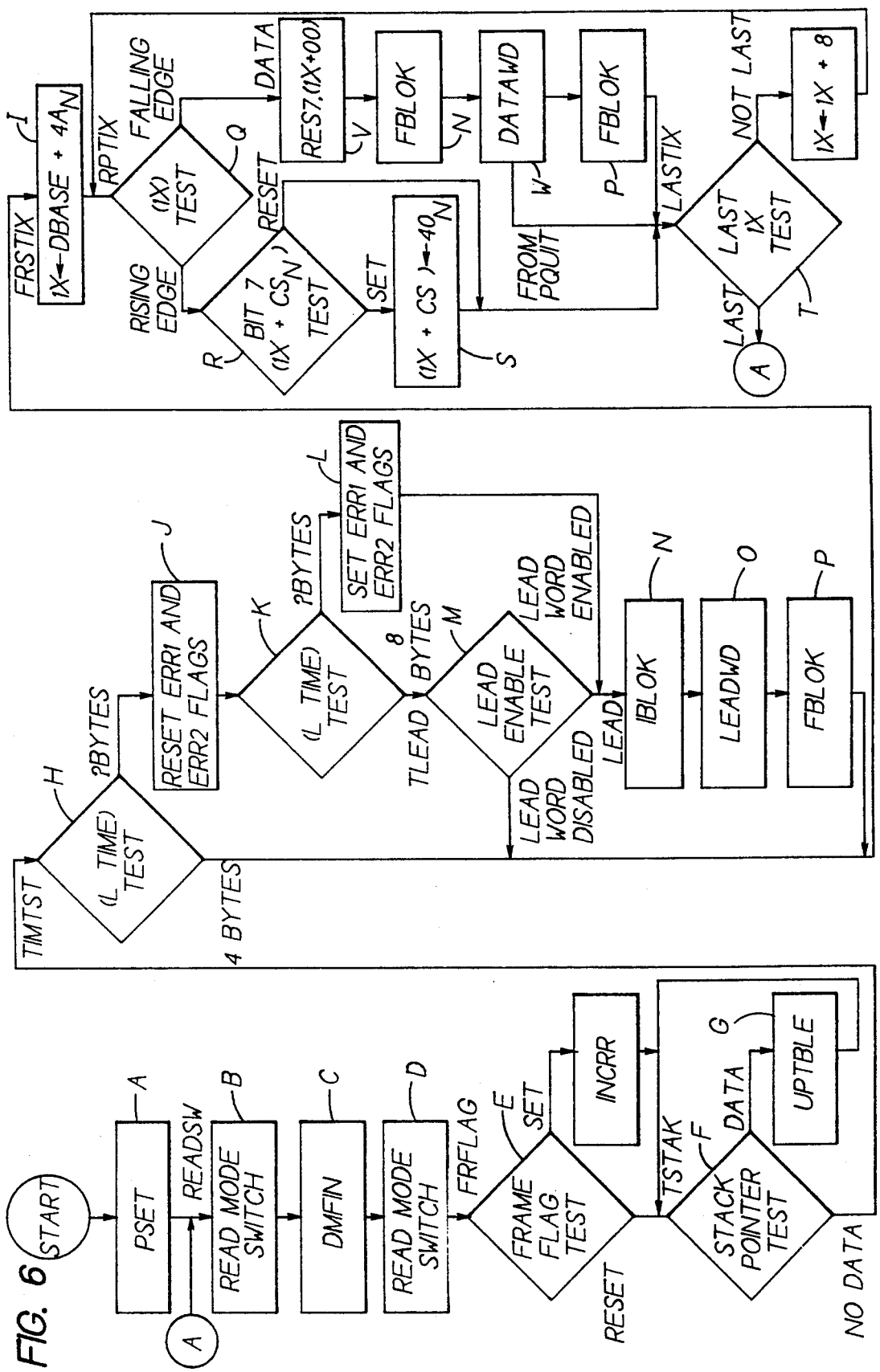
FIG. 6 is a logic flow diagram illustrating a main software routine controlling the operation of each Central Processor Unit of FIG. 2.
Figure 7:
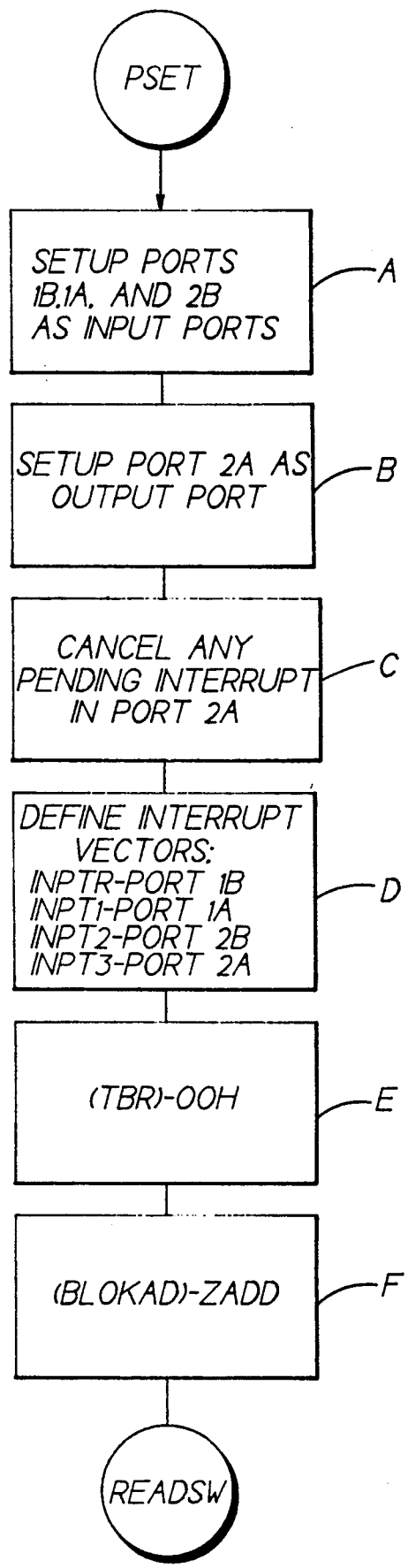

FIG. 7 is a flow diagram that illustrates a subroutine program PSET (Block A of FIG. 6). With the onset of program execution, four I/O ports of the PIO 54 are assigned their direction. Ports 1A, 1B and 2B are assigned as input ports (Block A), while port 2A is assigned as an output port (Block B). Ports 1A and 1B are used to service the DMF 48 while Port 2A services the Arbitrator Transmitter 44. Port 2B is used to acquire operator control data, such as T-V pulse classification switch data and selected First-Stage Signal Processing Subsystem filters. Any pending interrupts from the Arbitrator Transmitter 44 are canceled (Block C), interrupt vectors are defined to corresponding ports (Block D), and data byte counters and memory addresses are initialized (Blocks E, F).

At Block B of FIG. 6, the T-V pulse classification, along with the frequency selection chosen for the given exercise, is read into the system and stored into memory. The three bit T-V pulse classification specifies which T-V pulses are legal for tracking purposes. Illegal pulses are discarded during a pulse screening process described below. Frequency selection data is represented by three bits which subsequently appear in each Data Word.

A single bit provided from a front panel switch causes Lead Words to either be inhibited or transmitted from a given target port.

DMFIN (BLOCK C, FIG. 6 AND FIG. 8)

Figure 8:
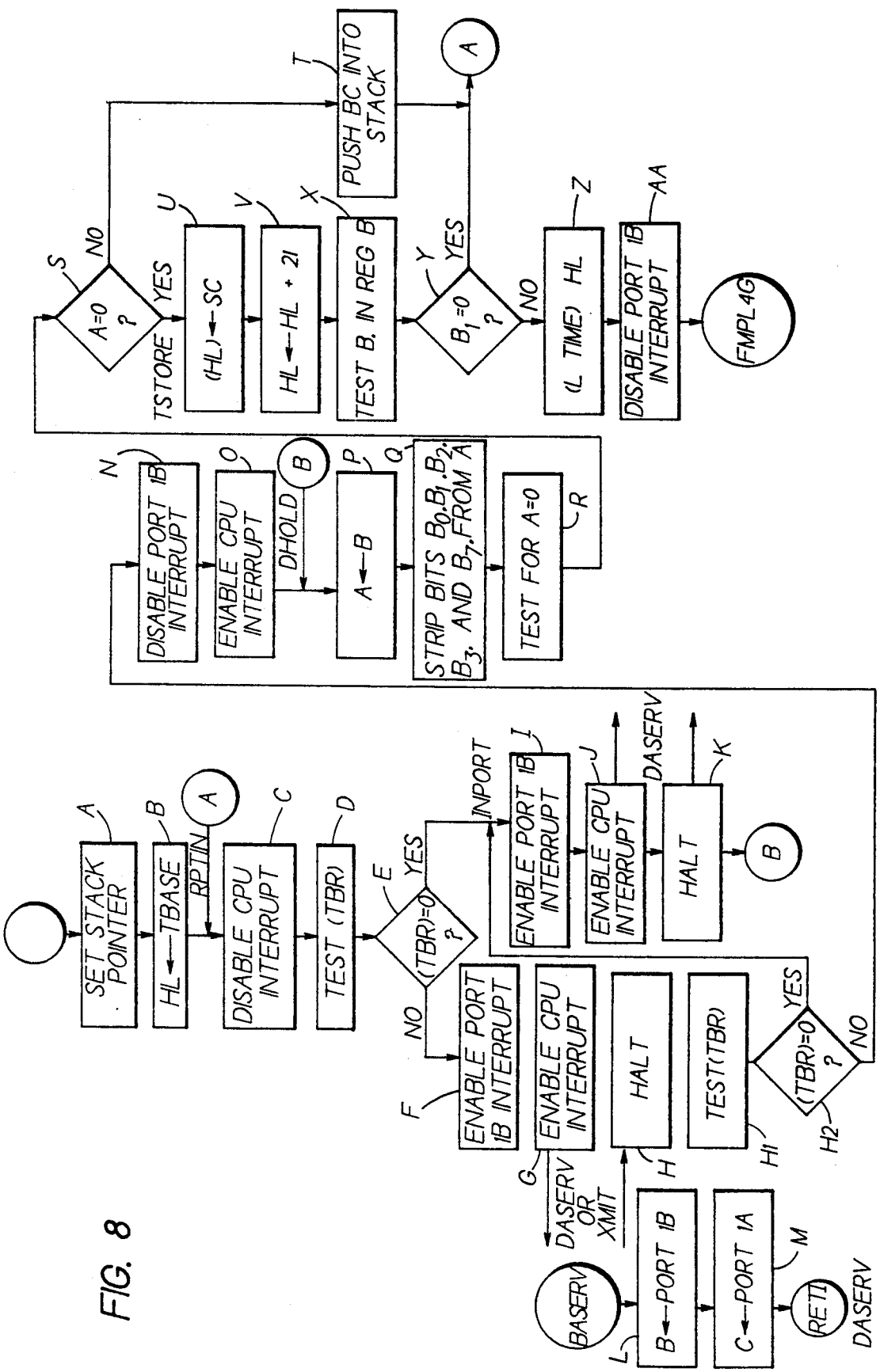

Program execution continues with a routine that allows input from the DMF 48 (DMFIN), as illustrated in the flow diagram of FIG. 8. The DMFIN subroutine provides for the input of a single packet of one or more channels of processor data caused by state changes and associated ITOD or ITOD and TOD data, or a single lead word data packet consisting only of TOD data. While providing this function, DMFIN allows itself to be interrupted when Arbitrator Transmitter 44 is ready to service any data that is finalized for transmission. The transmission of such finalized data has priority over the acceptance of new data from DMF 48.

A stack pointer, a register used to address a block of CPU memory reserved for storage of DMF 48 hydrophone data, is initialized (Block A), along with a register (HL) used to address memory for the storage of associated Time-of-Day/Interpolated Time-of-Day (TOD/ITOD) data (Block B). The CPU 52 is disabled from recognizing any interrupts (Block C), and the content of a memory location TBR is tested to determine if there are any data words awaiting transmission from the CPU 5 to the Arbitrator Transmitter 44 (Blocks D and E). The content of the memory location defined by TBR is an integer equal to the number of data words awaiting transmission. If an integer other than zero is present, a DMF 48 interrupt (Port 1B) is enabled (Block F) so as not to miss any incoming data while waiting for service from the Arbitrator Transmitter 44. The CPU 52 is enabled to receive an interrupt (Block G), and program execution is halted (Block H). Upon the occurrence of an interrupt, the source of the interrupt is determined. If the interrupt was from the Arbitrator Transmitter 44, then an XMIT service routine (FIG. 13) is executed and the data that was awaiting transmission is transmitted, causing (TBR)=0 (Blocks $H_1$, $H_2$). Program control then branches to INPORT (Blocks I, J, K). The DMF 48 interrupt is enabled (Block I), since it was disabled during execution of the XMIT routine, the CPU interrupt is enabled (Block J), and the program once again comes to a halt (Block K). An interrupt at this point causes a DASERV service routine to be executed (Blocks L and M). During DASERV, a single 16 bit DMF 48 data word is entered via Ports 1A and 1B of the PIO. Program control then passes to DHOLD.

If the source of the first of the two interrupts was not from the Arbitrator Transmitter 44, it must have originated from the DMF 48 (DASERV service routine) and 16 bits of DMF data would have been entered. The DMF interrupt is disabled (Blocks N,O) and program execution continues at DHOLD. A test is made to determine if the data is either First-Stage Signal Processing Subsystem hydrophone data or time data. Embedded in each DMF 48 data ward is the three bit Channel ID Code which defines the source of the data. As was previously stated, a value of 1 through 7 tags the data as being from channels 1 through 7, and thus First-Stage Signal Processing Subsystem hydrophone data. A value of 0 causes this data to be classified as time data (Blocks P, Q, R, S). If it is First-Stage Signal Processing Subsystem hydrophone data, the data is stored in the stack (Block T). The stack is arranged as a Last In/First Out (LIFO) buffer implemented within a segment of CPU memory, and uses the stack pointer to define its current address. Program execution then returns to RPTIN (Block C), where DMFIN attempts to input further DMF 48 data, or to transmit data to the Arbitratory Transmitter 44, if such data is ready.

If the data is instead found to be time data, then Blocks U, V, X, Y are executed wherein the two bytes are stored in a block of CPU memory reserved for time data. A test is made to determine if all the time data is present. A control bit (LTAG) is set in the last time word to signify the end of the time data. If LTAG is not set, the program control is returned to RPTIN (Block C) to input further DMF 48 time data, otherwise, the last address of the stored time data is saved in memory at LTIME (Block Z). The DMF 48 is disabled from interrupting (Block AA), and program control passes to FRLAG (Block D of FIG. 6).

When program control exits subroutine DMFIN, the CPU interrupt status is in an enabled mode if there is data awaiting transmission. This means that subsequent processing can be interrupted at any time if the Arbitrator Transmitter 44 recognizes this Target Tracking Port as requiring service for the transmission of finalized data. Exceptions to this occur during the IBLOCK and FBLOK routines, as described below.

Two data tables, a Rising Edge Table and a Falling Edge Table, accommodate incoming First Signal Processor data in CPU RAM. Each table is partitioned into seven segments, one for each First-Stage Signal Processing Subsystem Channel. Within each segment is contained the most recent rising/falling edge data and ITOD data for a particular channel. An 8-bit counter register counts the number of Interpolated Time-of-Day (ITOD) rollovers which occur between a rising edge and a falling edge for each channel for a given T-V pulse. These rollover registers are implemented within the Rising Edge Data Table.

Figure 9A:
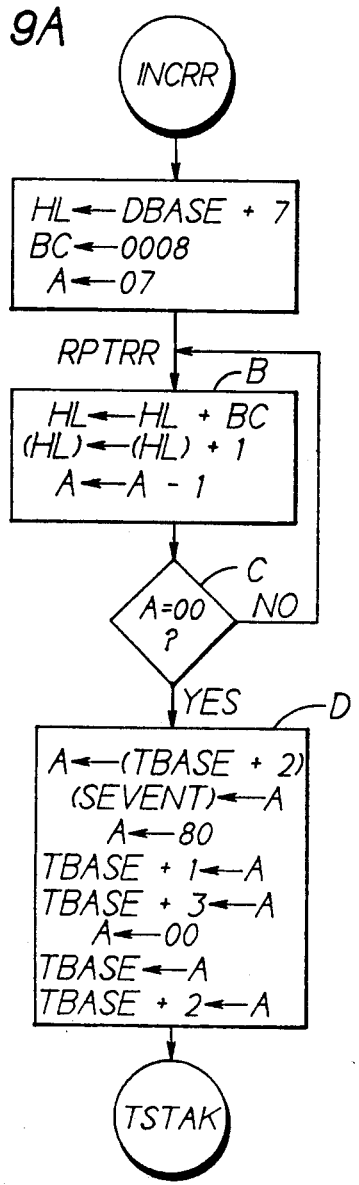
Figure 9B:
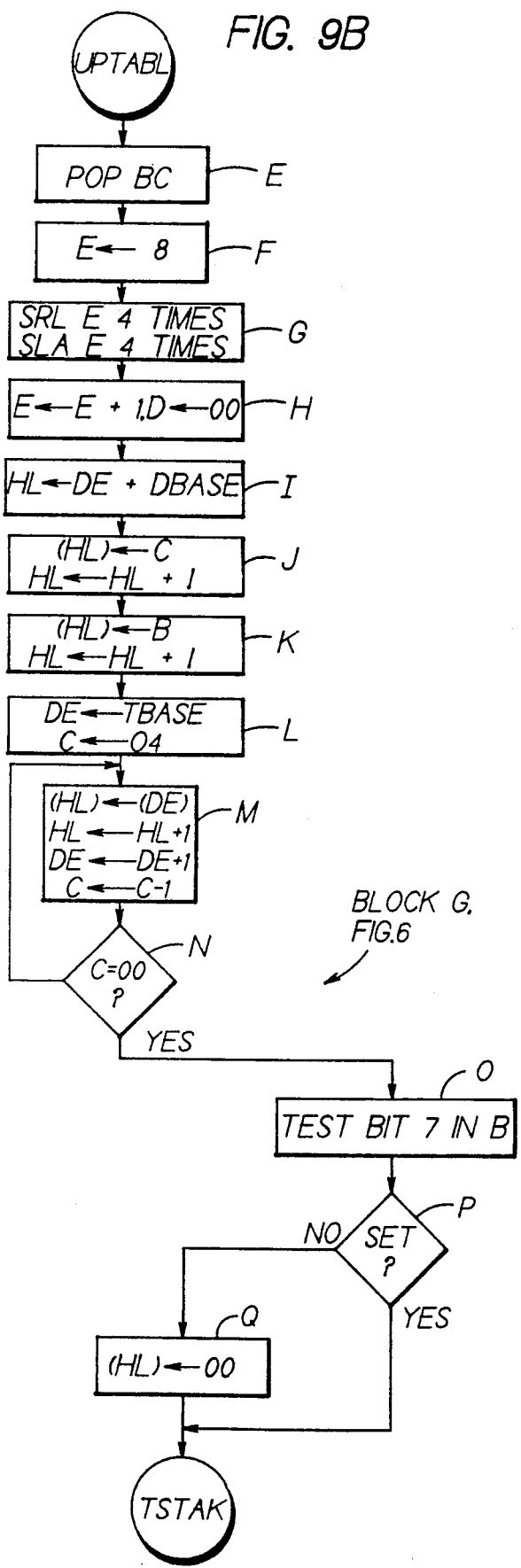

If the data packet just acquired by subroutine DMFIN contains a lead word, the control bit (Frame Flag) is set in the DMF time words. Testing of this bit (FIG. 6, Block D) causes control to be passed to an INCRR routine (FIG. 6, Block E). FIG. 9 is a flow chart that illustrates INCRR (Blocks A, B, C, D). All seven rollover registers in the Rising Edge Table are incremented, in that ITOD rollover coincides with the lead word event. In addition, the Time Code Interface in unit 46 uses the bytes ordinarily associated with ITOD to transmit another type of data, special event data, when a lead word occurs. This special event data is accommodated in INCRR by saving one of the ITOD bytes in a memory location designated SEVENT (Block D). Once this is accomplished, the ITOD bytes represented by TBASE through TBASE+3 are initialized to reflect the rollover state. Program control is then passed to TSTAK of the main program (Block F, FIG. 6).

At TSTAK, the stack pointer is tested for the presence of First-Stage Signal Processing Subsystem data. If First-Stage Signal Processing Subsystem data was read in, then the stack pointer would have automatically been decremented for each byte entered. The stack pointer is tested for a value other than its initial value, signifying that First-Stage Signal Processing Subsystem data is present. If First-Stage Signal Processing Subsystem data is present, either the Rising Edge or the Falling Edge Tables are updated by an UPTABL routine (Block G, FIG. 6). FIG. 9 also illustrates routine UPTABL (Blocks E-Q).

In general, the data is checked for a rising or falling edge. The Rising or Falling Edge Table, as appropriate, is then updated for the given channel with new channel and ITOD data. This routine uses the three bit channel ID and edge status bit embedded in each DMF word to derive its ultimate location in the Rising or Falling Edge Table. If the data is rising edge data, then the rollover Register (for that channel only) in the Rising Edge Table is reset. The stack pointer, having been incremented, is tested again, and if First-Stage Signal Processing Subsystem data still remains, UPTABL is repeated until all the First-Stage Signal Processing Subsystem data in the stack is exhausted. Program flow then continues to TIMTST of the main program (Block H, FIG. 6).

After the tables have been updated for all of the appropriate channels, the number of bytes of time data received is evaluated by testing, at Block H of FIG. 6, the value of the last memory location of time data processed (stored at L TIME). If the number is four, signifying interpolated time-of-day (not a lead word), program execution continues at FRSTIX (Block I). If the time data count is not four, error flags are reset (Block J) and the count is checked again (Block K). If the count is not eight, an invalid number of time bytes have been received and the data in this data packet is discarded (Block L). If the count is eight, and lead words are disabled from the front panel, (Block M) the program continues on to FRSTIX, (Block I) otherwise a lead word is generated (Blocks N, O, P).

The first step in formatting for transmission of either a lead word or a data word is to define the starting address of the memory space where the word will be stored while it awaits service from Arbitrator-Transmitter 44. The IBLOK subroutine (Block N), illustrated in FIG. 10a, accomplishes this function. In addition, IBLOK terminates further input data processing if the memory space allotted for transmission data is full.

Figure 10A:
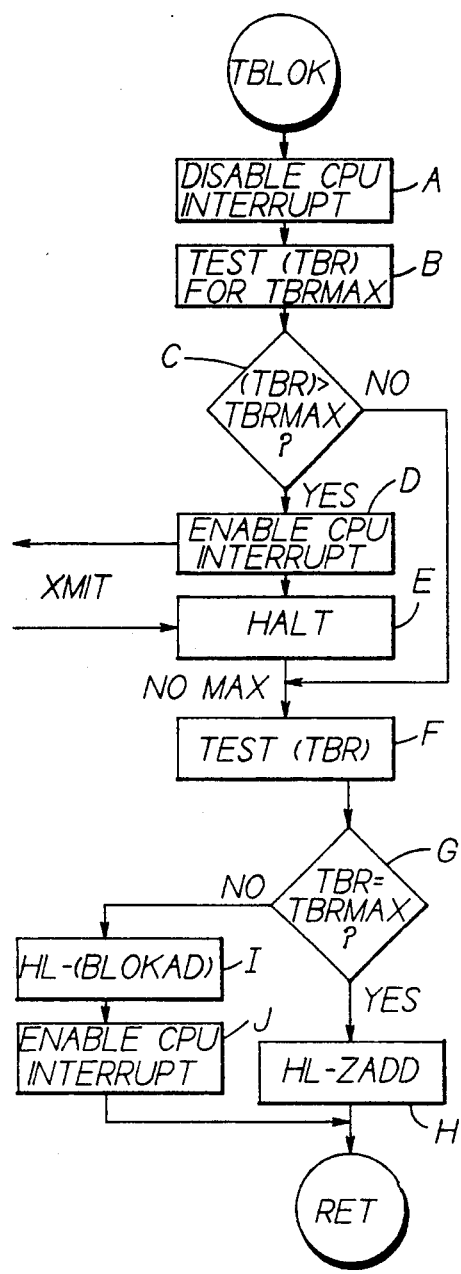

Referring to FIG. 10a, after disabling the CPU from recognizing interrupts (Block A), a check of the number of data words already stored in the transmission memory is made (Blocks B, C). If a specified maximum number of words is exceeded, then the CPU interrupt is enabled (Block D), the program is halted, (Block E) and the program then waits for an interrupt from the Arbitrator Transmitter 44 to unload the stored data. Program execution continues after the transmission of the data is completed (XMIT). If the maximum amount of stored data has not been reached, then the program continues instead at Block F (without the halt). The address of the new data block is determined, (Blocks G, H, I, J) depending upon whether it is to be a first data block, or appended instead to existing data blocks. This is accomplished by setting the starting address of the new data block to be formed either to ZADD, the beginning of the memory space, or (Block H) the contents of the location BLOKAD, the next address after the last block awaiting transmission (Block I).

It should be noted that CPU interrupts are inhibited during IBLOCK to prevent a transmission from interfering with the orderly placement of transmission data blocks. Interrupt enable status is restored at the end of the IBLOK if transmission data is pending (Block J).

Figure 11:
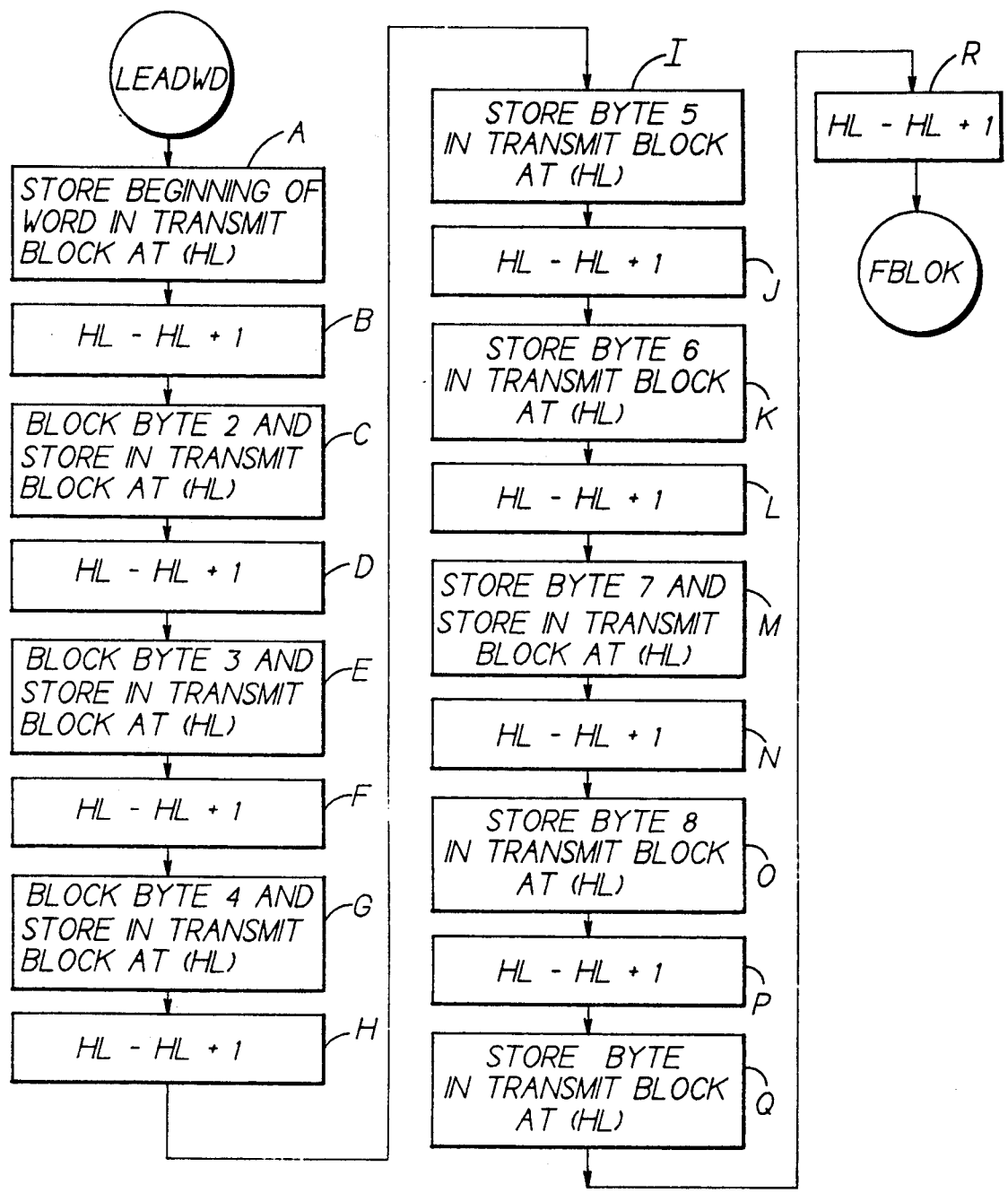
Figure 12A:
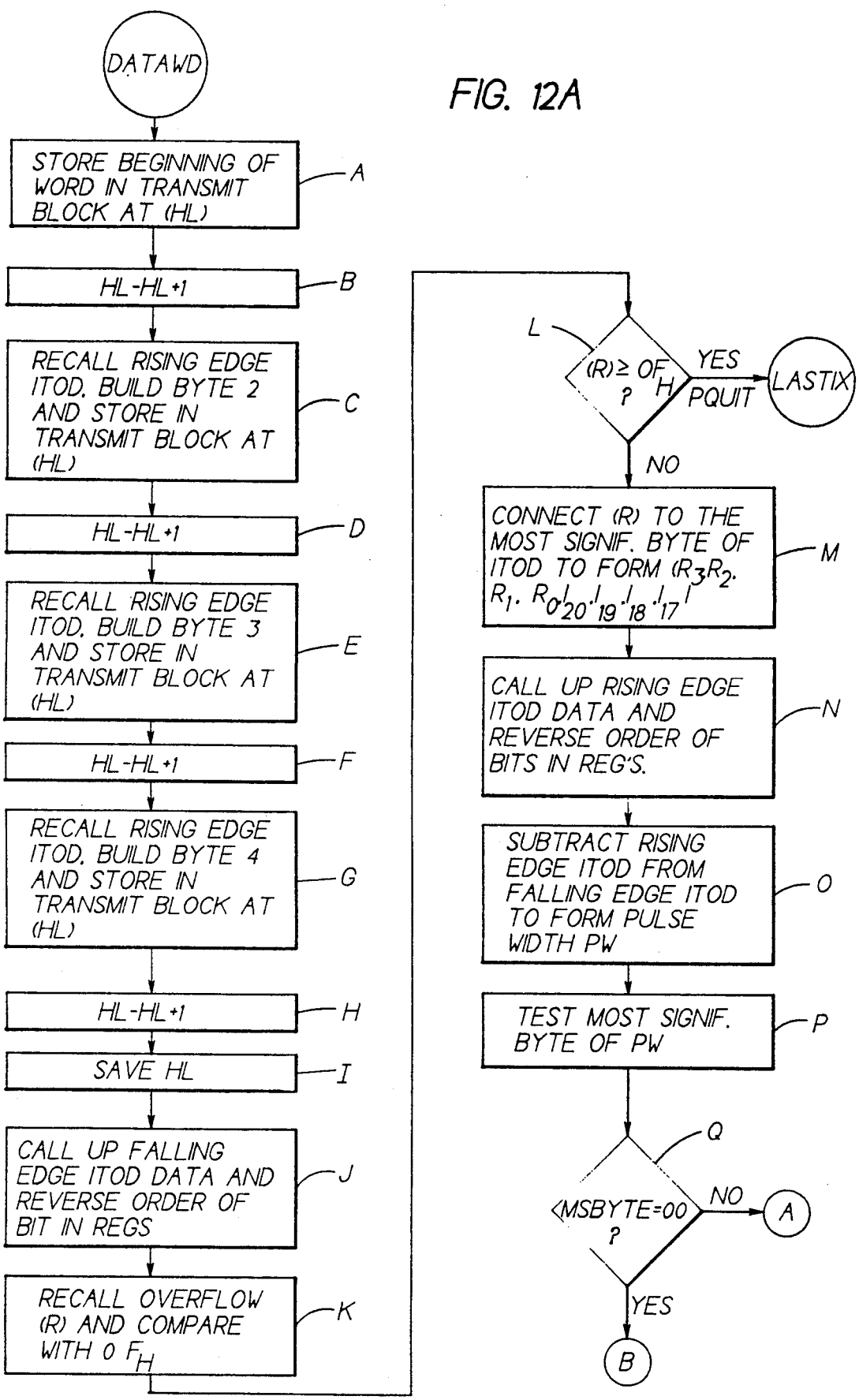
Figure 12B:
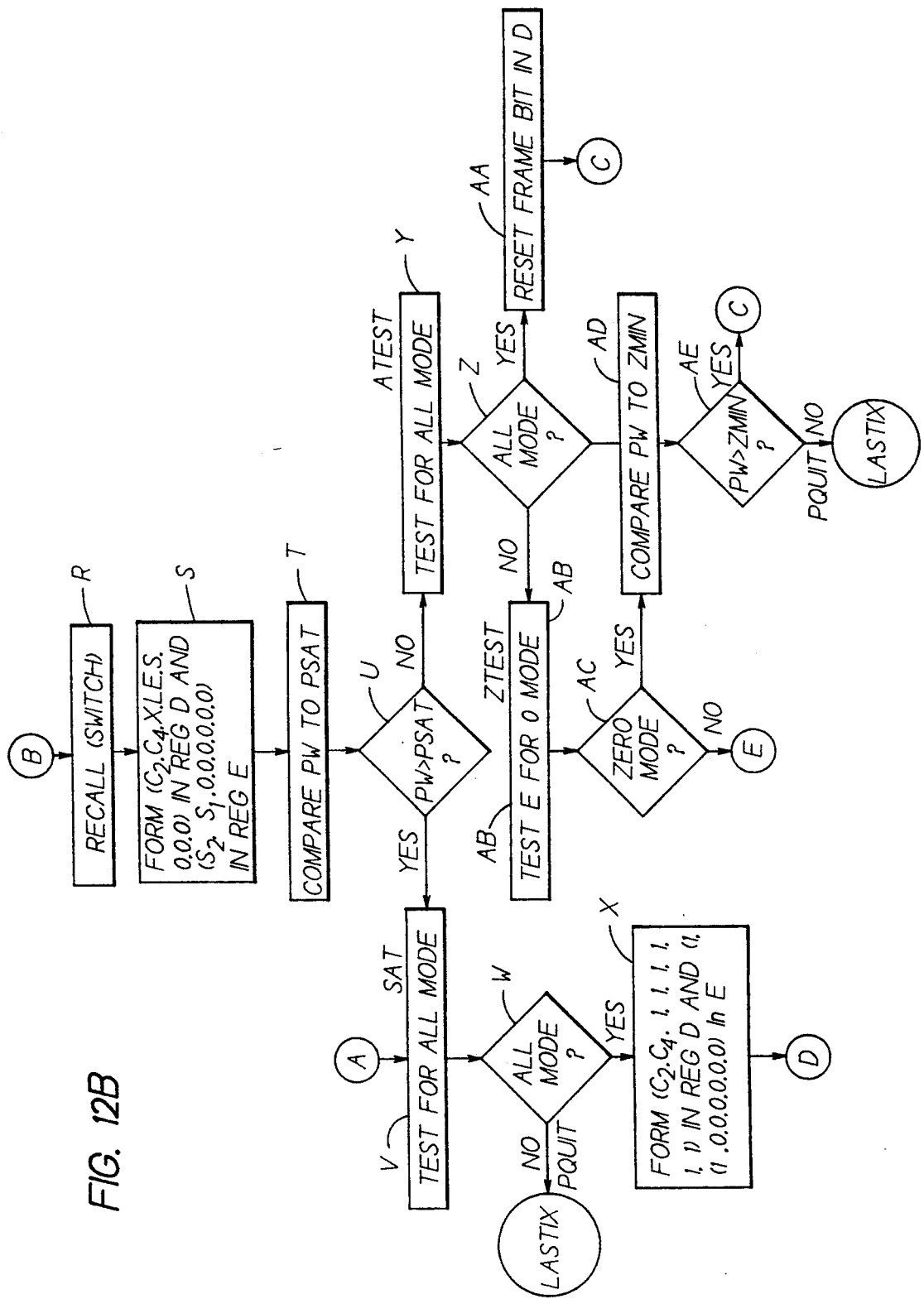
Figure 12C:
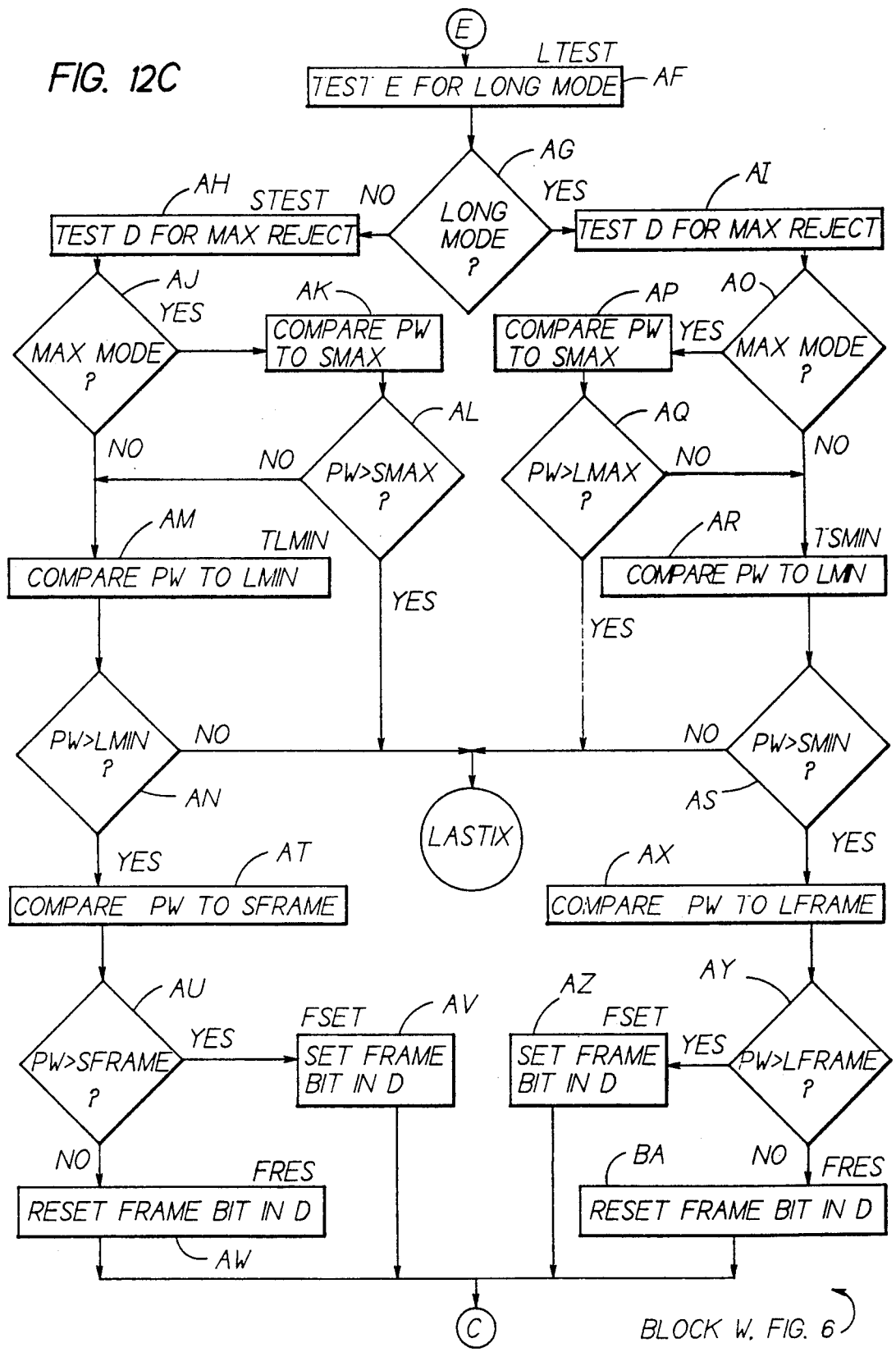
Figure 12D:
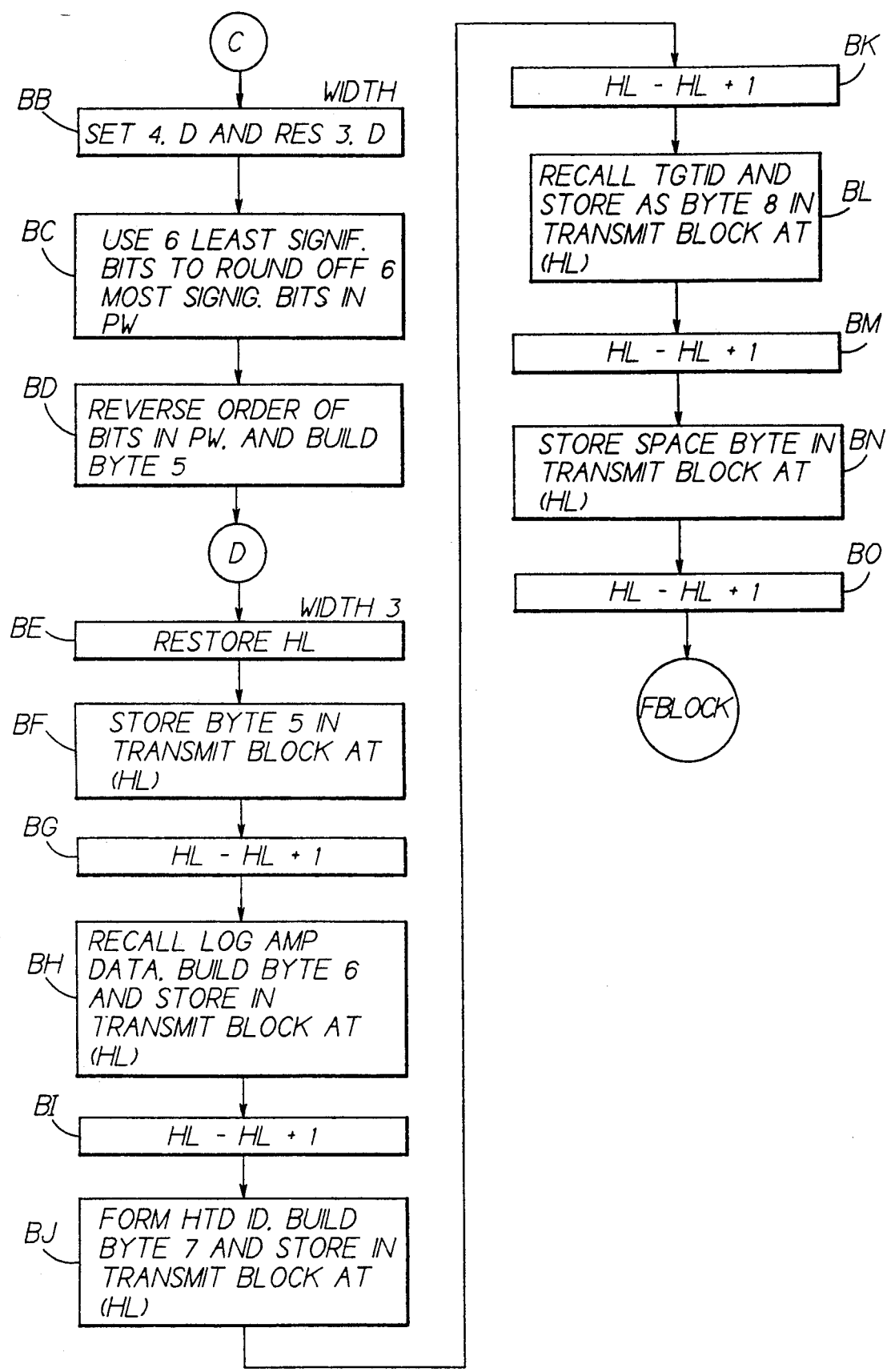

The lead word transmission data block is next generated (Block O, FIG. 6). FIG. 11 illustrates LEADWD, the subroutine which generates the lead word transmission block.

Referring to FIG. 11, a beginning of word byte ($01_{16}$ the byte that signifies the start of any word) is stored as the first byte of the block (Block A), and the memory addressed is incremented (Block B), as it is after every byte is stored. The second byte is created from the first seven bits of the time-of-day code and one marker bit (always a 1), and is stored (Blocks C, D). The marker bits are placed after every sixth bit to make the beginning of word sequence unique. The third byte containing the next seven bits of time code, and one marker bit, is stored (Blocks E, F), and then the last six bits of time code, one marker bit, and one spare bit, are stored as the fourth byte (Blocks G, H). Bytes 5 and 6 are formed accordingly at Blocks I-L. The seventh byte, containing the special event code, one marker bit, and one spare bit is then stored (Blocks M, N). Lastly, the eighth byte is stored, comprised of a marker bit, a flag bit (that is set to identify the word as a lead word), spare bits, and the site ID (Blocks O, P). At Blocks Q and R a spacer byte is also stored in the transmit block. It is noted that the transmission block consists of a total of 63 data bits.

During the formation of the lead word, the CPU 52 can be interrupted at any time to service the Arbitrator Transmitter 44 (ATX) if there is transmission data pending. Should this occur, the present lead word is appended to the memory space just emptied by the XMIT service routine. Since XMIT begins operating on data at the beginning of the memory space, the present word is relocated to the beginning of the transmission memory space. The subroutine FBLOK (Block P, FIG. 6) illustrated in FIG. 10b, performs the function of testing for this condition and relocating the block accordingly. This is also accomplished after data words are formed.

Figure 10B:
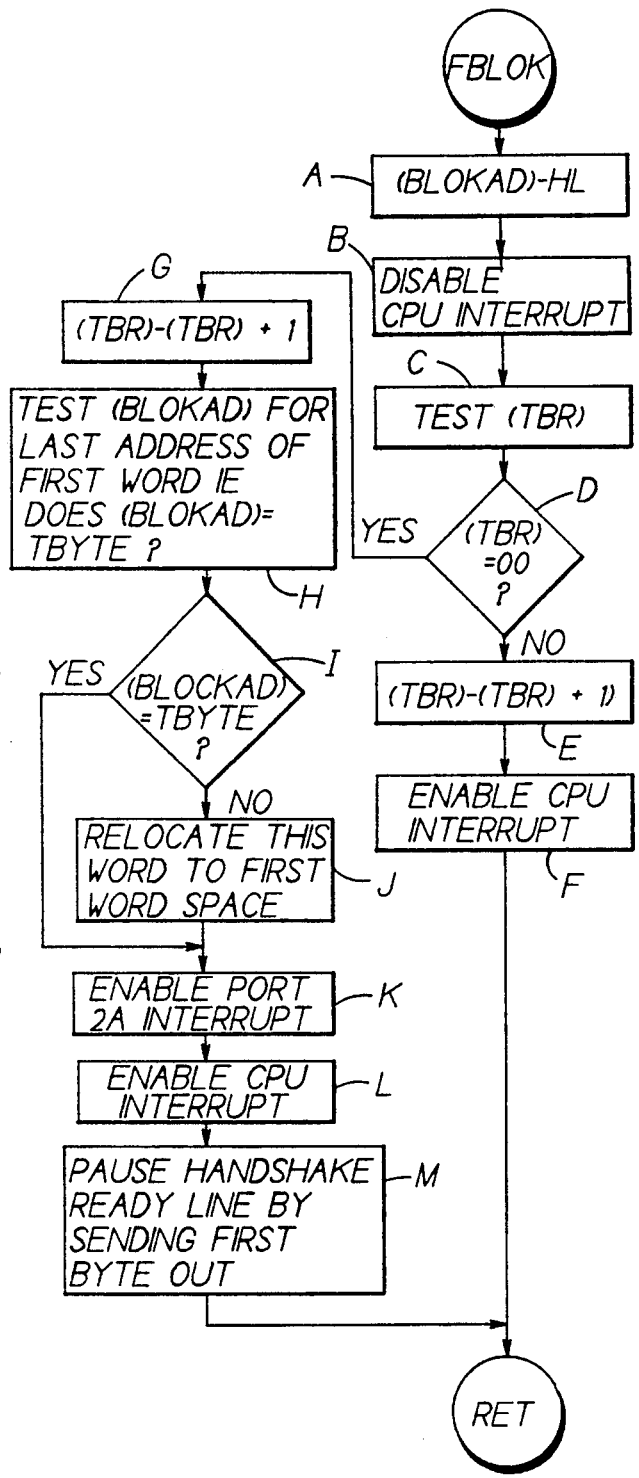

Referring to FIG. 10b, the last address of the memory space used for transmission data storage is saved at memory location BLOKAD (Block A). The CPU is disabled from recognizing interrupts (Block B) and a test is made to determine if previously stored data, if any, is still awaiting transmission, or if the block just created is the first (Blocks C, D). If there are data words, besides the one just created, then the block counter (TBR) is incremented (Block E). That is, the lead word transmission data just formed is appended to data already awaiting transmission. The CPU is enabled for interrupts (Block F) and the program continues. As with the routine IBLOK, FBLOK selectively disables and re-enables the CPU interrupt to prevent XMIT from interfering with the orderly placement of transmission data blocks.

If the block created is the only block, then a possibility exists there was other data, but that it was transmitted before the completion of this word. Hence, the word just created would not be the first block in the memory, and all the memory allocated for storage above this block would not be used. A relocation of this word is thus performed so that this word becomes the first block. TBR is first incremented (Block G), the contents of BLOKAD are tested, and the block is either relocated (Block J) or left unchanged. After this is accomplished, the Target Tracking Port (TTP) is ready to send this word as soon as the Arbitrator Transmitter (ATX) 44 is ready to accommodate it. The Port 2A (ATX) interrupt is enabled (Block K), which causes any subsequent CPU interrupt to recognize the ATX 44. The CP interrupt is then enabled (Block L).

Gaining the recognition of the ATX 44, which scans all TTP's for a transmit ready condition, is accomplished by placing the first byte to be transmitted in the Port 2A output register of PIO 54 and raising the associated Port 2a ready line (Block M). When the ATX 44 samples the ready line for this TTP, the raised ready line initiates handshaking and data transfer between the PIO 54 and the ATX 44, which in turn interrupts ongoing CPU 52 operation for subsequent data transmission by the XMIT service routine. The CPU 52 holds the ATX 44 in this mode, until all pending transmission data is sent, by responding to each ATX 44 handshake interrogation with new data within a specific time interval. After the last byte has been sent the CPU 52 does not respond to an ATX interrogation within this time interval. The ATX 44 is consequently released from this TTP, resumes scanning for an asserted ready line of another TTP, and the CPU program control returns to the point in the main program or subroutine from where it was interrupted. The operation of the ATX 44 is described in greater detail below.

The next step, whether it be after a generation of a lead word or the branch taken when the test for the number of time bytes proves to be four, is to check the Falling Edge Table of the first channel for its edge status. Program control is thus at FRSTIX (Block I, FIG. 6). If no falling edge data is detected, at block Q, then the channel does not have any processed data to transmit, and its associated Rollover Register in the Rising Edge Table is tested for an indication of unrealistic pulse duration (Blocks R, S).

If an excessively long pulse is indicated, the Rollover Register is reset. Program execution continues with the testing of the next channel's edge status (Blocks T, U). All six remaining channels are thus examined. For any channel that contains falling edge data, a data word is formatted (Blocks, V, N, W, P) for transmission before the next channel is examined. After the seventh channel has been accounted for, program control returns to READSW (Block B).

In greater detail, if a given channel has a falling edge status, the bit in the falling edge table which indicated this status is reset to prevent erroneous falling edge indications in subsequent passes through this loop (Block V). A data word block is then generated. The same initialization takes place for this block as for a lead word generation (IBLOCK). The data word is then formatted and stored (Block W), as shown in the flow chart of FIG. 12.

In FIG. 12, the first byte of the data word, the beginning of word byte, is stored in the transmit block (Block A), and the address is incremented (Block B). The second byte is then stored (Blocks C, D), the second byte consisting of the first seven code bits of the interpolated time of day taken from the corresponding Rising Edge Table entry for the channel and one marker bit. Next the third byte is stored, consisting of the next seven bits of the interpolated time-of-day code, and the marker bit (Blocks E, F). The fourth byte contains the remaining six bits of ITOD, one marker bit, and the least significant bit of a 3-bit hardware computer tag. After the fourth byte has been stored (Blocks G, H, I) the ITOD from the Falling Edge Table is recalled (Block J). Note that in order to accommodate the serial output prescribed for ITOD, the ITOD in both the Rising and Falling Edge Tables are stored such that their least significant bits are stored in the most significant bits of the registers. For any calculations to be done with such data, their bits must be rearranged. When recalled, the falling edge ITOD is rearranged into a 20-bit, three byte binary number. In order to account for ITOD rollovers, this 20 bit word is appended to the Rollover Register such that the Rollover Register represents the most significant bits. Before this is done, the Rollover Register is recalled and compared to a default count that will abort data word generation for the given channel should that count be exceeded (Blocks K, L). Otherwise, the Rollover Register and the 20-bit falling edge ITOD are merged to form a 24-bit number (Block M). The rising edge ITOD is recalled and subtracted from the falling edge ITOD to form the pulse width (Blocks N, O). The pulse width, however, is not the correct pulse width. It must be corrected for the difference between a normal falling edge ITOD binary rollover from 20 to 21 or more bits, and the rollover imposed by the TCI lead word. That is, a normal binary rollover would ordinarily correspond to a falling edge ITOD integer of 100000 H, while the TCI 46 imposed rollover is at C3500 H. The program, therefore, corrects the pulse width by subtracting 3CB00 H for each rollover recorded in the Rollover Register (Block O). The most significant byte of the three byte pulse width is then tested for a non-zero value (Blocks, P, Q). If a non-zero value is found, pulse screening begins.

Before pulse screening begins, front panel switch settings stored in (SWITCH) are recalled (Block R). The pulse width is compared to PSAT and program control is directed either to SAT or ATEST (Blocks S, T, U).

Pulse screening options are selected at the front panel. There are four user-selectable modes, ALL, ZERO, SHORT, or LONG. When either the SHORT or LONG option is selected, there is the additional option of invoking maximum pulse width rejection.

When control moves to SAT, the SWITCH register is tested to determine if the ALL mode is selected (Blocks V, W). If the ALL mode is not selected, the data word generation for this channel is aborted. If the ALL mode is selected, the fifth byte is formed with the two remaining hardware computer tag bits, a marker bit, and five ones (for four bits of the pulse width and one for the frame flag bit), and the fifth transmission word byte is stored in the transmission block (Block X). Program control then passes to WIDTH 3.

If instead program control moves to ATEST at Block U, a test is made to determine if the ALL mode is selected (Blocks Y, Z). In that the pulse width is not saturated, it is then processed according to one of the modes previously listed. If the ALL mode is selected program control is passed to WIDTH, via Block AA, for the formatting of the fifth transmission byte.

Otherwise, control passes to ZTEST and SWITCH is tested for the ZERO mode (Blocks AB, AC). If the ZERO mode is selected, the pulse width is compared to a pre-determined minimum pulse width (Blocks AD, AE). If the pulse width does not exceed this minimum width, the data word generation for this channel is aborted. Otherwise, control passes to WIDTH.

At Blocks AF, AG, AH, AI, if either the SHORT mode or the LONG mode is being used, SWITCH is tested at Blocks AJ and AO to determine if the pulse will be compared to a pre-determined maximum pulse width, i.e., MAX REJECT is invoked. If the comparison is to be made, and the pulse width exceeds the maximum width for either mode (LMAX for the LONG MODE at Blocks AP and AQ, SMAX for the SHORT MODE at Blocks AK and AL), the data word generation is aborted. If the pulse width does not exceed the maximum width, or if the comparison was not made, the pulse width is then compared to pre-determined minimum pulse width (Blocks AM, AN, AR, AS).

Again, the data word generation is aborted if the pulse width does not exceed the minimum width (LMIN for LONG MODE, SMIN for SHORT MODE). If the pulse width exceeds the minimum, a further test is made to determine if the pulse is a frame pulse. If it is, the frame bit of the fifth data byte is set. Otherwise, this bit is reset. Program control then passes to WIDTH (Blocks AT-BA).

The fifth transmission byte is constructed with the frame bit, two remaining computer tag bits, a marker bit and four bits of the pulse width. After the pulse width screening is complete, the pulse width consists of 12 bits. The six least significant bits are used to round off the six most significant bits, with the most significant bits being used as the final pulse width. Granularity is 0.64 msec/bit. After the fifth transmission byte is stored at the proper address in memory (Blocks BB-BG) the sixth byte is then constructed. The sixth pulse uses the two remaining pulse width bits, a marker bit, and five bits of the pulse amplitude data, LOG AMP (Blocks BH, BI). The seventh byte is formed with the remaining pulse amplitude bit, a marker bit and six hydrophone ID bits (Blocks BJ, BK). Lastly, the eighth byte is composed of a marker bit, a bit which is normally reset for a data word, three target ID bits, and two site ID bits (Blocks BL, BM). A spacer byte is also stored at Blocks BN, BO. Once again it is noted that the total transmission block consists of 63 data bits. After the eighth byte is stored, the program executes FBLOK (FIG. 10b) in the same manner as was done during the lead word block formation.

After executing FBLOK, a test is made (Block T, FIG. 6) to determine if every channel has had the opportunity to generate a data word. If not, the next channel's table is addressed (Block U), and the program returns to the test of the edge status for that channel (Block Q and so forth). Otherwise, the program execution is returned to READSW where the frequency selection and pulse classification is read in.

The service subroutine XMIT, used for transmitting data to the ATX 44, is illustrated in FIG. 13. When the ATX 44 becomes available to service a particular target, that target will either have data to transmit, or it will have a specified time to produce data to transmit before the ATX 44 moves on to the next target. In either case, if the first data byte is available for transmission, program execution begins with the interrupt and initial handshake previously described. Data transfer will continue until all of the completely formatted data words have been sent from CPU 52 via PIO 54 to ATX 44. A subsequent orderly return to the interrupted main program or subroutine is assured by disabling the DMF interrupt and saving all the flags and registers (Blocks A, B). The address of the second data byte is recalled (Block D), since the first byte has already been used to alert the ATX 44, and two counters are initialized, one with the number of remaining bytes for this word (referred to as TBC), and the other (referred to as TWC) with the total number of words that will be transmitted (Blocks E, F). The ATX interrupt vector is replaced with the PIO handshake vector (Block G) to facilitate the transfer of data between the PIO 54 and the ATX 44. It is noted that a previously executed dummy subroutine PRTRET (Block C) unlocks the PIO Port 2A for further interrupt driven handshakes by issuing a Return from Interrupt (RETI) instruction. The PIO interrupt for Port 2A is then enabled (Block H) along with the CPU interrupt (Blocks I, J), and the program is halted (Block K).

Upon an interrupt, the data is exchanged, the memory address is incremented (Block L), and the TBC is decremented (Block M). The latter is then checked for a zero count, signifying the end of that particular word (Blocks N, O). If the end of the word was not transmitted, the program returns to Blocks H-K for enabling the interrupts and halting the program for another byte to be transferred (OUTBYT). If the end of the word was transmitted, a delay is introduced which postpones further data transfer until the data word which the ATX 44 just received is relayed by the ATX to the front end or utilization processor 56. Then the total-word counter (TWC) is decremented (Block P) and checked for other data words to be transmitted (Blocks Q, R). If there are other data words present, then the number of bytes in the data word is loaded into the TBC (Block S), and program execution returns to OUTBYT.

Each transfer of a data byte to the ATX 44 restarts an internal timer within the ATX 44. This timer holds the ATX 44 at the present TTP for a fixed period of time, in the absence of a handshake signal from the PIO 54. In this manner the TTP is allowed sufficient time to respond with the next data byte. Otherwise the ATX 44 abandons this TTP. If there are no data words left in memory to be transmitted to the ATX 44, then the ATX 44 interrupt vector is restored at Block T (so that the ATX can once again interrupt the CPU when it is able to service this target) and the Port 2A interrupt is disabled (Block U), the TWC is reset to zero (Block V), all flags and registers are restored (Block W), and the program returns to the point before the transmission occurred.

ARBITRATOR TRANSMITTER 44

The final major component of the Second-Stage Signal Processing Subsystem 40 is the Arbitrator Transmitter (ATX 44). The task of the ATX 44 is to systematically provide data transmission between each of up to eight individual target port channels of Second-Stage Signal Processing Subsystem 40 and the utilization processor's front end 56. Referring again to FIG. 2, each Target Channel of Subsystem 40 includes the Data Multiplexer/FIFO (DMF) 48 interfaced to the Central Processor Unit 52 via the Parallel Input/Output circuit 54, which in turn is interfaced to the ATX 44. As described above, the DMF 48 accepts data from the First-Stage Signal Processing Subsystem and passes it to the associated CPU52 via PIO54. The ATX 44 enables, in turn, each CPU52 to transmit its stored data to the utilization processor's front end 56.

The ATX 44 services up to eight of the CPU/PIO units, although only four are shown in FIG. 2, one for each of the target channels. Two basic operations take place simultaneously in the ATX 44. One operation accepts data strings from one of the CPU/PIO units and temporarily stores the data in a FIFO. The other operation serially transmits this temporarily stored data to the utilization processor's front end 56.

Figure 14A:
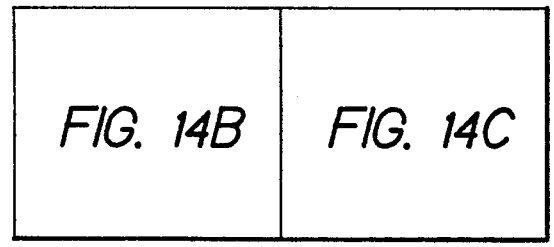
FIGS. 14A-14C are schematic diagrams of the Arbitrator Transmitter of FIG. 2, with FIG. 14A depicting the spatial relationship of FIG. 14B to FIG. 14C.
Figure 14B:
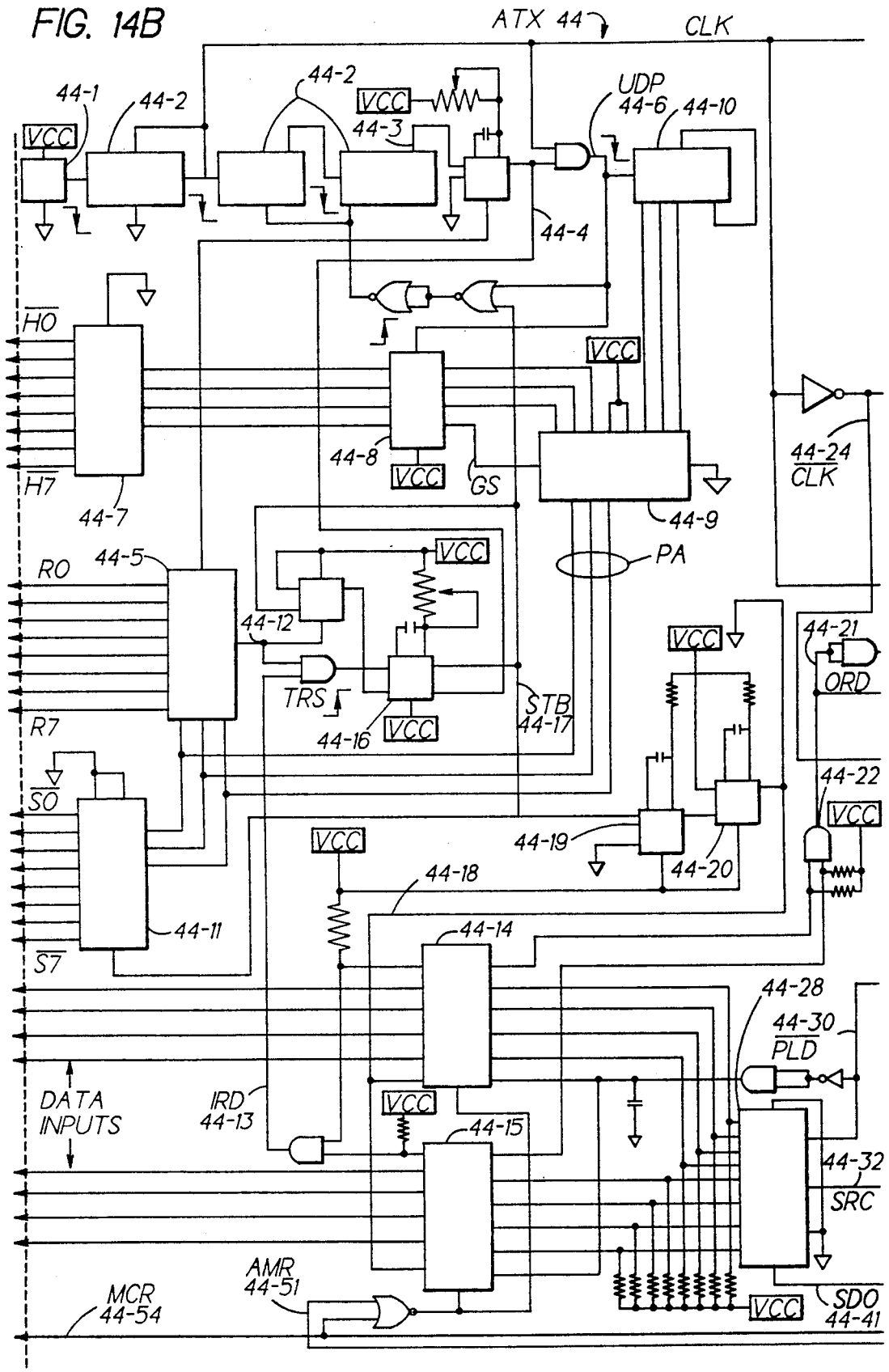
Figure 14C:
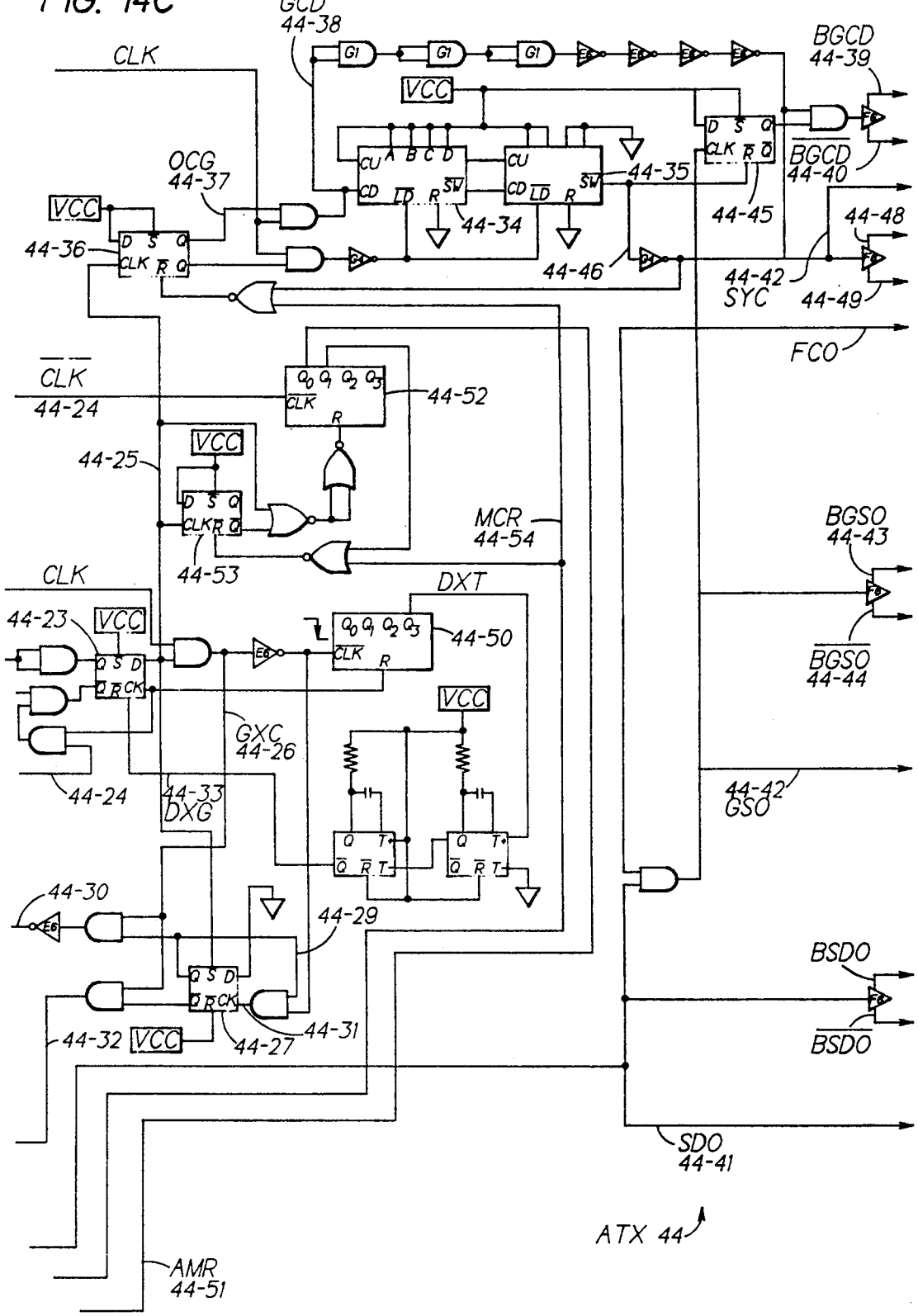

Referring to FIG. 14, the ATX 44 contains a 40.8 Khz clock 44-1 which generates a 24.5 microsecond cycle (approximately 12.25 microsecond pulses). I/O operations of the ATX 44 are controlled by this clock. Assignment of the ATX 44 to a specific CPU/PIO 52/54 can occur either by a scanning process or by a Half-Full FIFO alert from one of the DMF 48 units. Once assigned to a particular CPU/P10 52/54, the ATX 44 accepts and transmits all of the data that the CPU memory contains. When all of the data in the CPU/PIO has been transferred, the ATX 44 uncouples from the CPU/PIO and moves on to a next CPU/PIO. The ATX 44 responds to the presence of data by a handshake protocol between it and the CPU/PIO 52/54. The above-mentioned internal timer within the ATX 44 counts the time between handshake interrogations from the CPU/PIO 52/54. If a preset time is exceeded, the ATX 44 assumes that no further data is available, and moves on to a next CPU/PIO.

In greater detail, a counter 44-2 functions as the timer that allows a pre-selected time for a data ready signal from the CPU/PIO to alert the ATX 44 to the presence of data. If the corresponding ready signal for a given CPU/PIO 52/54 is received before the timer count expires, the timer 44-2 is reset, and the ATX 44 is held at this CPU/PIO 52/54 for at least one more complete reset time interval. Meanwhile, the ATX 44 receives the first byte of data for transmission and it sends a strobe signal back to the CPU/PIO signifying the receipt of the byte. By this handshake mechanism, the CPU/PIO is informed that it can proceed to send the next byte. For the CPU/PIO to continue to hold the ATX 44, it must respond with the next data byte before the timer 44-2 count expires. The timer 44-2 is reset whenever a ready signal (R0-R7) is received from the selected CPU/PIO. After all of the data has been sent, the CPU/PIO ceases sending ready signals. The ATX timer 44-2 then expires.

When this occurs, the output RLT 44-3 of the counter 44-2 goes high, signifying that the time has expired. A RLO window 44-4 is created, disabling a PIO ready line multiplexer 44-5, and enabling the next clock pulse to generate a UDP pulse 44-6. The UDP pulse performs three tasks. On the rising edge, it resets the counter 44-2. The DMF Half-Full (HFUL) lines $\overline{H0}-\overline{H7}$ are input to a priority encoder 44-7, whose outputs are sent to a quad latch 44-8 on the rising of the UDP pulse. The outputs of latch 44-8 are fed to a data selector 44-9. The falling edge of the UDP pulse 44-6 updates a counter 44-10 that contains the address of the CPU/PIO port that is currently being serviced. A gate select signal GS determines whether the next port address is to be selected from the port counter 44-10, or from the priority encoder latch 44-8. If $\overline{GS}$ is low when strobed into latch 44-8 (signifying there is a HFUL signal from one of the DMF's 48), then the next port address is determined from the latch 44-8. In this way, the Target Channel whose HFUL signal is active overrides the port counter 44-10 for gaining access to the ATX 44. Multiplexer 44-9 selects the appropriate port address. A single port's handshake signals are selected by the resulting three bit port address (PA) output from the multiplexer 44-9. Multiplexer 44-5 thus selects and inputs the appropriate ready signal from R0-R7, and a demultiplexer 44-11 selects and outputs the corresponding strobe from $\overline{S0}-\overline{S7}$. If $\overline{GS}$ is high when strobed into latch 44-8, indicating that no HFUL signals are present, the port address following the previous address is selected by multiplexer 44-9 from port counter 44-10.

A RDY signal 44-12 from the selected port is gated with an Input Ready (IRD) signal 44-13 of FIFOs 44-14 and 44-15 to trigger a one shot 44-16. A STB pulse 44-17 generated from the one shot resets counter 44-2, sends a strobe ($\overline{S0}-\overline{S7}$) to the CPU/PIO via demultiplexer 44-11, and issues a Shift-in Signal (SI) 44-18 to the FIFOs 44-14 and 44-15. A next one shot 44-19 in line after the STB pulse 44-17 provides a delay to allow time for the CPU/PIO to receive the strobe output by demultiplexer 44 11, and allow data to settle on the data lines. Another one shot 44-20 provides the SI pulse 44-18, which causes the received data to be stored in the FIFOs 44-14 and 44-15. So long as the selected port has data to transmit, access to the ATX 44 is retained. If there is no ready signal from the port before counter 44-2 completes its timeout interval, then a change in the port address takes place as described earlier. Once the port counter 44-10 reaches a count of eight, the Q3 output of counter 44-10 causes a reset of the counter, providing a port address of zero. Sequential polling and data transfers between the ATX 44 and the other Target Channels continues in the manner described above.

Data transmission from the ATX 44 to the utilization processor is initiated upon receipt of the first data byte by the ATX 44 from a Target Channel. An Output Ready (ORD) signal 44-21 from the FIFOs, which is propagated via gate 44-22, initiates the transmission process. If there is data stored in the FIFOs 44-14 and 44-15, the ORD signal 44-21 of the FIFOs is high. This ORD signal forms a data input for a flip-flop 44-23 that is triggered on the rising edge of a clock pulse ($\overline{CLK}$) 44-24. The trigger is generated only when there is data available for output, i.e., ORD 44-21 is high. A one gate delay network ensures that the only condition which sets flip-flop 44-23 is an occurrence of a transition of ORD from low to high before the falling edge of $\overline{CLK}$ 44-24. At this point, the ATX 44 transmission process becomes synchronized to the 40.8 Khz clock 44-1.

Subsequently signal IXG 44-25 goes high, enabling the generation of GXC pulses 44-26 and the lifting of the assertion of a set condition for a flip-flop 44-27. GXC pulses 44-26, derived from the 40.8 Khz clock, are used to shift eight bit parallel data from the FIFOs 44-14 and 44-15 into a serial data stream for transmission. The flip-flop 44-27 controls whether the GXC Pulses 44-26 load or clock a serializing shift register 44-28. P/S 44-29 controls this operation. When the ATX 44 is inactive, the default state of P/S 44-29 is high, causing the first GXC pulse 44-26 to generate both a load signal (44-30) for the shift register 44-28, and a shift out for the FIFOs 44-14 and 44-15. At the conclusion of pulse PLD* 44-30, the first bit of the byte loaded into the shift register 44-28 appears at the output and is presented to output buffers 44-43 and 44-44. An inverter and a buffer provide a delay for SO, which allows the shift register 44-28 to load the data from the FIFOs before it is shifted out from the FIFOs. The falling edge of the GXC pulse 44-26 toggles the flip-flop controlling P/S 44-29 and causes it to go low (via PSR 44-31). This disables generation of any further PLD or SO signals, and enables generation of shift pulses (SRC) 44-32 for the shift register 44-28. Seven SRC pulses 44-32, derived from GXC 44-26, shift the remaining seven data bits to the output buffers. Each bit is shifted out on the rising edge of SRC 44-32. The rising edges of the GXC pulses 44-26 update a counter 44-50 which counts the total number of GXC pulses 44-26 for the byte being transmitted.

It will be appreciated that inasmuch as one GXC pulse 44-26 is needed to parallel load the shift register 44-28, and seven pulses are needed to serially shift the remaining data to the utilization processor front end 56, a total of eight GXC pulses 44-26 are required for one 8-bit data byte cycle. Therefore, while the rising edge of the eighth GXC pulse 44-26 is shifting the last bit of data, it also generates signal DXG 44-33 to reset the flip-flop 44-23 responsible for generation of the GXC pulses. With IXG 44-25 disabled, further GXC pulses are disabled and counter 44-50 is reset. The reset of IXG 44-25 also asserts a set condition for the P/S flip-flop 44-27, causing P/S 44-29 to go high. If there is more data to be transmitted in the FIFOs, ORD 44-21 will be high in advance of the next rising edge of $\overline{CLK}$ pulse 44-24. It will be further appreciated that inasmuch as DXG 44-33 expires in advance of the rising edge of the next $\overline{CLK}$ pulse 44-24, the cycle for transmitting one byte described above is repeated.

The ATX 44 accepts data from the CPU/PIO as 8-bit bytes. Because each burst of acoustic signal energy, or "ping", received by a hydrophone results in the generation of several bytes of data, a string of bytes is transmitted from each CPU/PIO. A preset control of how many bytes of data are required for a given hydrophone ping is provided to assure that no extraneous data is transmitted. Two count-down counters 44-34 and 44-35 function as a bit counter that allows a pre-determined number of bits to be transmitted for each ping. This number is preferably set at 63. A flip-flop 44-36 generating an OCG 44-37 output governs the counting procedure. In a reset state, the OCG flip-flop 44-36 enables the clock pulses 44-24 to parallel load the counters 44-34 and 44-35 with the selected bit string length. When IXG 44-25 goes high for the first time, signifying the beginning of the transmission process, this flip-flop is set, thereby raising OCG 44-37. Subsequent $\overline{CLK}$ pulses 44-24 are gated out as GCO pulses 44-38. The GCO 44-38 pulses are employed to derive BGCO-$\overline{BGCO}$ signals 44-39 and 44-40, respectively, which are in turn used by the Front End to clock in the ATX serial data. In addition, GCO 44-38 is gated with the Serial Data Output (SDO) 44-41 from the shift register 44-28 to generate a Gated Serial Data Output (GSO) 44-42. Buffers pass buffered versions of these signals (BGCO 4439, BGCO 44-40, BGSO 44-43, and GCSO 44-44, respectively) to the front end 56. The ungated SDO 44-41 and GSO 44-42 are also available at the output of the ATX 44.

Every 63-bit data string is transmitted with the first seven bits always being reset (zero) and the eighth bit always being set (one). The Gated Clock Output enables a clock pulse 44-24 for each data bit, hence, there are 63 clock pulses 44-24. The Front End, however, does not anticipate receiving clock pulses from GCO 44-38 during the first seven bits, and therefore expects to receive only 56 clock pulses. As a result, clock pulses during the first seven bits are inhibited so as not to disrupt the Front End timing. This is accomplished by gating GCO 44-38 with the output of a flip-flop F7 44-45 which is set by the rising edge of the eighth bit of the GSO. The resulting clock output transmitted to the front end 56 is BGCO and $\overline{BGCO}$ (44-39 44-40).

As was stated, the down counter 44-34 and 44-35 is preset to 63 at beginning of the transmission process. Each GCO pulse 44-38 decrements this count. When the bit counter reaches a count of zero, a borrow line ($\overline{BW}$) 44-46 goes low on the falling edge of the GCO pulse 44-38 that caused the zero state. This causes the OCG flip-flop 44-36 to be reset such that the next $\overline{CLK}$ pulse reloads down counters 44-34 and 44-35 with the initial bit count of 63. The $\overline{BW}$ signal 44-46 remains active for one half of a clock cycle before being reset. The $\overline{BW}$ signal 44-46 is inverted to form a SYC pulse 44-47, whose purpose is to mark the end of the transmitted data word for the front end 56. After $\overline{BW}$ 44-46 expires, the bit counter circuit is prepared for the next 63-bit transmission. The SYC pulse 44-47 is transmitted to the front end 56 as BSYC 44-48 and 44-49.

An automatic master reset (AMR) 44-51 is sent to the FIFOs 44-14 and 44-15 after each 63-bit transmission to ensure error free FIFO performance. With the onset of transmission (IXG 4425), the flip-flop 44-53 is set, thereby unlocking a counter 4452 that controls the signal AMR 44-51. The presence of IXG 4425, however, holds counter 44-52 reset. So long as transmission is taking place, IXG 44-25 remains high during all falling edges of $\overline{CLK}$ pulses 44-24. When transmission ceases, IXG 44-25 is reset, and the reset condition of the 4-bit counter 44-52 is released. A first subsequent $\overline{CLK}$ pulse 44-24 causes a Q0 output of the counter 44-52 to go high. This results in the master reset (AMR 44-51) of the FIFOs 44-14 and 44-15. The next $\overline{CLK}$ pulse causes the Q1 output of the counter 44-52 to go high, which in turn resets the flip-flop 44-53, and thus resets the counter 44-52. The reset condition remains such that further $\overline{CLK}$ pulses have no effect. On the next occurrence of 44-25 (the start of a new data string transmission), the procedure is repeated. A manual reset of the ATX 44 is accomplished through means of a master clear line (MCR) 44-54.

Based on the foregoing description, it can be seen that the DMF/CPU/PIO combination enhances the data handling capability of the Second-Stage Signal Processing Subsystem 40. In the prior art embodiment of the Second-Stage Signal Processing Subsystem (FIG. 1) each data channel in a target port accepts, converts, and reads the digital signal information from the First Signal Processor via the Signal Verifier 25, FIG. 1. This data is then input into the Data Word Register 29, whereby a scanner sequentially scans each Register and then transmits a Register's data into a holding buffer 19 until the data can be transmitted to the range computer. These buffers occupy substantial space, and require a significantly more power than the presently preferred embodiment described above. As was previously noted, the prior system has only one output buffer. Thus, if this buffer failed or malfunctioned, all data would be lost and the entire system shut down.

In the novel Second-Stage Signal Processing Subsystem 40, each group of seven channels has an associated buffer (FIFO 48-2). If one buffer fails or malfunctions, the other targets may still continue to track data. In essence, the DMF 48 (which as hereinabove noted is inclusive of a selectively acting data unit accumulator) performs the combined function of the previous subsystem's Signal Verifier 25 (FIG. 1), and Data Word Register 29 (FIG. 1). However, the DMF 48 reduces an amount of data that may be lost. In the prior system, the verifier and data word register can accept only one signal from the First-Stage Signal Processing Subsystem at a time, thus any other information that is being transmitted for that particular channel is lost if the signal verifier and data word register are currently in use. With the DMF/CPU/PIO, more than one unit of data can be accepted at one time, due to the improved buffering capabilities wherein each target port has an associated buffer.

The DMF 48 (which as hereabove noted is inclusive of a selectively acting data unit accumulator) tags the arrival of data with the time of day and stores it temporarily in the associated buffer until it can be transmitted to the CPU/PIO buffer. Once the data is transmitted to the CPU/PIO buffer, the CPU interprets and formats the data into blocks for serial transmission to the utilization processor. If the CPU/PIO buffer reaches its maximum capacity, and thereby becomes at risk of losing data, this buffer stops accepting data from the DMF 48. The DMF 48 then backs up the data in an internal buffer. When the DMF buffer begins to approach a FULL condition, the Arbitrator Transmitter 44, or any other compatible handshaking mechanism, is activated to allow the DMF/CPU/PIO to have priority in unloading the buffered data.

It should be realized that the combination of the DMF/CPU/PIO can be employed as a single target port for tagging data with other information other than time information, and for buffering, interpreting and retransmitting data for use by any suitable application. For example, the protocol may be changed from bit serial to byte parallel, with handshake. Furthermore, the DMF 48 can be employed independently with other systems as an interface device for tagging event data with selected data (time data for example) to create tagged data packets. Such data packets may then be stored and processed by one or more other systems that are connected to the DMF 48.

In light of the above, it is therefore understood that within the scope of the appended claims, the invention may be practiced otherwise than as specifically described.

What is claimed is:

1. A selectively acting data unit accumulator which receives data from a plurality of data sources, comprising:
   timing means for establishing an operating cycle having a first period followed by a second period;
   input means, operable during the first period, for receiving an alert signal from individual ones of the data sources, an assertion of an alert signal indicating that an associated data source has data available for outputting to the data unit accumulator, said input means including means for comparing, for each of the alert signals, a current state of the alert signal to a previous state for detecting an occurrence of the assertion of the alert signal; and
   buffer means, responsive to the operation of said comparing means, for receiving and storing, during the first period, a unit of data from a data source having an asserted alert signal, said buffer means being responsive to the storage of the unit of data within the buffer means, during the first period, for receiving and storing, during the second period, other information that is associated with the unit of data stored during the first period.

2. A selectively acting data unit accumulator as set forth in claim 1 wherein each of the plurality of data sources includes an acoustic transducer for generating units of data that are received and stored by said buffer means.

3. A selectively acting data unit accumulator as set forth in claim 1 wherein each of the data sources includes a different one of an array of hydrophones.

4. A selectively acting data unit accumulator as set forth in claim 1 wherein the other information includes time of day information.

5. A selectively acting data unit accumulator as set forth in claim 1 and further including means for sequentially generating identification information for identifying individual ones of said plurality of data sources, and wherein said buffer means is coupled to an output of said generating means for storing, during the first period and in association with a unit of data received from a data source having an asserted alert signal, an identification of the data source.

6. A selectively acting data unit accumulator as set forth in claim 1 wherein said buffer means outputs the data stored therein in a parallel format, and further including means, having an input coupled to an output of said buffer means, for generating a status signal indicating that said buffer means has at least one unit of data stored therein.

7. A selectively acting data unit accumulator as set forth in claim 6 and further including data processing means, responsive to the generation of said status signal, for reading out the stored data in the parallel format and for organizing the stored data into a data packet having a predetermined format, said data processing means further including a temporary storage means for storing data packets awaiting subsequent utilization.

8. A selectively acting data unit accumulator as set forth in claim 7 wherein there are a plurality of said data unit accumulators each having one of said data processing means coupled thereto, wherein each of said data unit and associated data processing means operate independently from others of said data unit accumulators and associated data processing means, and further including means, responsive to one of said data processing means organizing the stored data from an associated data unit accumulator into a data packet, for receiving, buffering, and transmitting the data packet as a serial data stream.

* * * * *